(12) United States Patent
Borthwick

(10) Patent No.: US 6,523,019 B1
(45) Date of Patent: Feb. 18, 2003

(54) PROBABILISTIC RECORD LINKAGE MODEL DERIVED FROM TRAINING DATA

(75) Inventor: Andrew E. Borthwick, Brooklyn, NY (US)

(73) Assignee: Choicemaker Technologies, Inc., New York, NY (US)

( * ) Notice: Subject to any disclaimer, the term of this patent is extended or adjusted under 35 U.S.C. 154(b) by 0 days.

(21) Appl. No.: 09/429,514

(22) Filed: Oct. 28, 1999

Related U.S. Application Data
(60) Provisional application No. 60/155,063, filed on Sep. 21, 1999.

(51) Int. Cl.[7] .................................................. G06N 5/00

(52) U.S. Cl. ............................................ 706/45; 707/2

(58) Field of Search ............................. 706/45, 46, 15; 707/2

(56) References Cited

U.S. PATENT DOCUMENTS

| | | | |
|---|---|---|---|
| 5,819,291 A | 10/1998 | Haimowitz et al. | 707/201 |
| 5,960,430 A | 9/1999 | Haimowitz et al. | 707/6 |
| 5,970,482 A | * 10/1999 | Pham et al. | 706/12 |
| 5,991,758 A | 11/1999 | Ellard | 707/6 |

OTHER PUBLICATIONS

Yuhe Li et al; Reducing Uncertainties in Data Mining; 1997; IEEE; 0–8186–8271–X/97; 97–105.*

Ming–Syan Chen et al; Data Mining: An Overview from a Database Perspective; 1996; IEEE; 1041–4347/96; 866–883.*

Mattis Neiling, "Data Fusion with Record Linkage," Online Proceedings of the 3rd Workshop Föderierte Datenbanken, (Dec. 11, 1998).

Adwait Ranaparkhi, "A Maximum Entropy Model for Part–Of–Speech Tagging," Proceedings of the Conference on Empirical Methods in Natural Language Processing (1996).

José C. Pinheiro and Don X. Sun, "Methods for Living and Mining Massive Heterogeneous Databases," Proceedings Fourth International Conference on Knowledge Discovery and Data Mining, Proceedings of the Fourth International Conference on Knowledge Discover and Data Mining (Aug. 27–31, 1998).

Jaynes, E. T., 1957, "Information Theory and Statistical Mechanics," *Physical Review*, 106, 620–630.

Private Communication dated Apr. 11, 2002 from Dr. William E. Winkler to Andrew Borthwick attaching: Getoor, "Selectivity Estimation Using Probabilistic Models," ACM SIGMOD (5/21–24, 1002).

Winkler, William E., Presentation given at Virginia Tech on Nov. 1, 2002, entitled "Record Linkage and Machine Learning".

Winkler list of conference (6 pages).

(List continued on next page.)

Primary Examiner—John A. Follansbee
Assistant Examiner—Joseph P. Hirl
(74) Attorney, Agent, or Firm—Nixon & Vanderhye P.C.

(57) ABSTRACT

A method of training a system from examples achieves high accuracy by finding the optimal weighting of different clues indicating whether two data items such as database records should be matched or linked. The trained system provides three possible outputs when presented with two data items: yes, no or I don't know (human intervention required). A maximum entropy model can be used to determine whether the two records should be linked or matched. Using the trained maximum entropy model, a high probability indicates that the pair should be linked, a low probability indicates that the pair should not be linked, and intermediate probabilities are generally held for human review.

19 Claims, 15 Drawing Sheets

Top-Level System View

OTHER PUBLICATIONS

Belin, T. R., and Rubin, D. B. (1995), "A Method for Calibrating False– Match Rates in Record Linkage," *Journal of the American Statistical Association*, 90, 694–707.

Copas, J. R., and F. J. Hilton (1990), "Record Linkage: Statistical Models for Matching Computer Records," *Journal of the Royal Statistical Society*, A, 153, 287–320.

Lait, A.J., and B. Randell (Sep. 1995), Dept. of Computing Science, University of Newcastle upon Tyne,"An Assessment of Name Matching Algorithms," unpublished .

Porter, E. H., and W. E. Winkler (1999), Approximate String Comparison and its Effect in an Advanced Record Linkage System, @ in *Record Linkage Techniques 1997*, Washington, DC:

Winkler, W. E. (1990b), "String Comparator Metrics and Enhanced Decision Rules in the Fellegi– Sunter Model of Record Linkage," *Proceedings of the Section on Survey Research Methods*, American Statistical Association., 354–359.

Winkler, W. E. (1990c), "On Dykstra's Iterative Fitting Procedure," *Annals of Probability*, 18, 1410–1415.

Winkler, W. E. (1994), "Advanced Methods for Record Linkage," *Proceedings of the Section on Survey Research Methods, American Statistical Association*, 467–472 (longer version report 94/05 available at http://www.census.gov/srd/www/byyear.html).

Winkler, W. E. (1995) "Matching and Record Linkage," in B. G. Cox et al. (ed.) *Business Survey Methods*, New York: J. Wiley, 355–384.

"Record Linkage Techniques—1997, Proceedings of an International Workshop and Exposition," Mar. 20–21, 1997, Arlington, VA—index of conference proceedings (papers being submitted in .pdf form on CD).

Record Linkage Workshop: Bibliography of Background Papers, U.S. Census Bueau, www.census.gov.

Recommendations, Matching Group: Administrative Records Subcommittee, pp 3–4 (May 1985).

RLESearch—Probablisitic record linking engine,http://ned-info.nih.gov, 19 pages.

Verykios, Vassilios et al., "Automating the Approximate Record Matching Process," Computer Sciences Dept., Purdue University, West Lafayette, IN, pp. 1–19 (Jun. 15, 1999).

Matthew A. Jaro. Probabilistic linkage of large public health data files. *Statistics in Medicine 14*, 491–498 1995.

Matthew A. Jaro. Advances in record–linkage methodology as applied to matching the 1985 census of Tampa, Florida. *Journal of the American Statistical Association 84*. Jun. 1989.

Stephanie Jocums, Stephen S. Entman, Jr., Edward F. Mitchel, and Joyce M. Piper. Using vital records linkage. *American Journal of Preventive Medicine*, 11(2):75–78. 1995.

A.J. Lait and Brian Randell. An assessment of name matching algorithms. Unpublished. Sep., 1995. Available from the author at Brian.Randell@newcastle.ac.uk.

Margaret C. M. Macleod, Caroline A. Bray, Stephen W. Kendrick, and Stuart M. Cobbe. Enhancing the power of record linkage involving low quality personal identifiers: use of the best link principle and cause of death prior likelihoods. *Computers and Biomedical Research 31*, 257–270. 1998 (Received Jan. 20, 1998).

Alvaro E. Monge and Charles P. Elkan. An efficient domain-–independent algorithm for detecting approximately duplicate database records. *Workshop on research issues on data mining and knowledge discovery in conjunction with ACM SIGMOD*. 1997.

Alvaro E. Monge and Charles P. Elkan. The field matching problem: Algorithms and applications. *Proceedings of the second international conference on knowledge discovery and data mining*. Aug., 1996.

Howard B. Newcombe, Martha E. Fair, and Pierre Lalonde. The use of names for linking personal records. *Journal of the American Statistical Association 87*. Dec., 1992.

Semaphore Corporation. Merge/Purge and Duplicate Detection. Web page. http://www.semaphorecorp.com/mpdd/mpdd.html. 1996.

Jeff Stokes Du Bose. Retaining duplicate data in an immunization registry. Pamphlet distributed by Scientific Technologies Corporation. Aug., 1998.

Jeff Stokes Du Bose. Defining duplicate records in an immunization registry. Pamphlet distributed by Scientific Technologies Corporation. Aug., 1998.

Trecom Business Systems and Dataline Inc. UPIF process architecture. Unpublished system documentation. Oct., 1997.

Adam L. Berger, Stephen A. Della Pietra, Vincent J. Della Pietra. 1996. A m entropy maximum approach to natural language processing. *Computational Linguistics*, 22(1):39–71.

Adam L. Berger and Harry Printz. A comparison of criteria for maximum entropy/minimum divergence feature selection. In Proceedings of the Third Conference on Empirical Methods in Natural Language Processing (Jun. 1998), N. Ide and A. Boutilainen, Eds., The Association for Computational Linguistics, pp. 97–106.

Andrew Borthwick. *A Maximum Entropy Approach to Named Entity Recognition*. PhD thesis. New York University, 1999. Available from the NYU Computer Science Department Library or at http://cs.nyu.edu/cs/projects/proteus/publication/index.html.

M. R. Crystal and F. Kubala, "Studies in Data Annoatation Effectiveness," Proceedings of the DARPA Broadcast News Workshop (HUB–4), (Feb., 1999).

Stephen Della Pietra, Vincent Della Pietra, and John Lafferty. 1995. Inducing features of random fields. Technical Report CMU–CS–95–144, Carnegie Mellon University.

Howard B. Newcombe. 1988. Handbook of Record Linkage: Methods for Health and Statistical Studies, Administration, and Business. Oxford Medical Publications.

Harry Printz, 1998. Fast computation of maximum entropy/minimum divergence model feature gain. *In Proceedings of the Fifth International Conference on Spoken Language Processing*.

Ronald Rosenfeld. *Adaptive Statistical Language Modeling: A Maximum Entropy Approach*. PhD thesis, Carnegie Mellon University, 1994. CMU Technical Report CMU–CS–94–138.

Esko Ukonnen "Finding Approximate Patterns in Strings", *Journal of Algorithms* 6:132–137, (1985).

Max G. Arellano. Assessing the significance of a match. Unpublished. Advanced Linkage Technologies of America, Inc. Jan. 17, 1995.

Max G. Arellano. An implementation of a two–population Fellegi–Sunter probability model. U.S. Department of the Treasury, Publication 1299. Dec., 1985.

Max G. Arellano. Issue in identification and linkage of patient records across an integrated delivery system. *Journal of Healthcare Information Management 12.* (3) 43–52 Fall, 1998, Max G. Arellano and Donald W. Simborg. A probabilistic approach to the patient identification problem. *Proceedings of the Fifth Annual Symposium on Computer Applications in Medical Care.* Nov., 1981.

William W. Cohen. Integration of heterogeneous databases without common domains using queries based on textual similarity. *Proceedings of the ACM SIGMOD Conference on Data Management.* 1998.

William W. Cohen. Some practical observations on integration of Web information. *WebDB '99.* 1999.

Martha E. Fair and Pierre Lalonde. Application of exact ODDS for partial agreements of names in record linkage. *Computers and Biomedical Research 24*, 58–71. 1991.

Ivan P. Fellegi and Alan B. Sunter. A theory for record linkage. *Journal of the American Statistical Association 64.* 1183–1210. Dec., 1969.

Carol Friedman and Robert Sideli. Tolerating spelling errors during patient verification. *Computers and Biomedical Research 25*, 486–509. 1992.

Helena Galhardas, Daniela Florescu, Dennis Shasha, and Eric Simon. An extensible framework for data cleaning. Tech. Rep. Institut National De Recherche en Informatique et en Automatique. Jul., 1999.

Mauricio A. Hernandez and Salvatore J. Stolfo. Real–world data is dirty: data cleansing and the merge/purge problem. *Journal of Data Mining and Knowledge Discovery 2*, 19–37. 1997.

\* cited by examiner

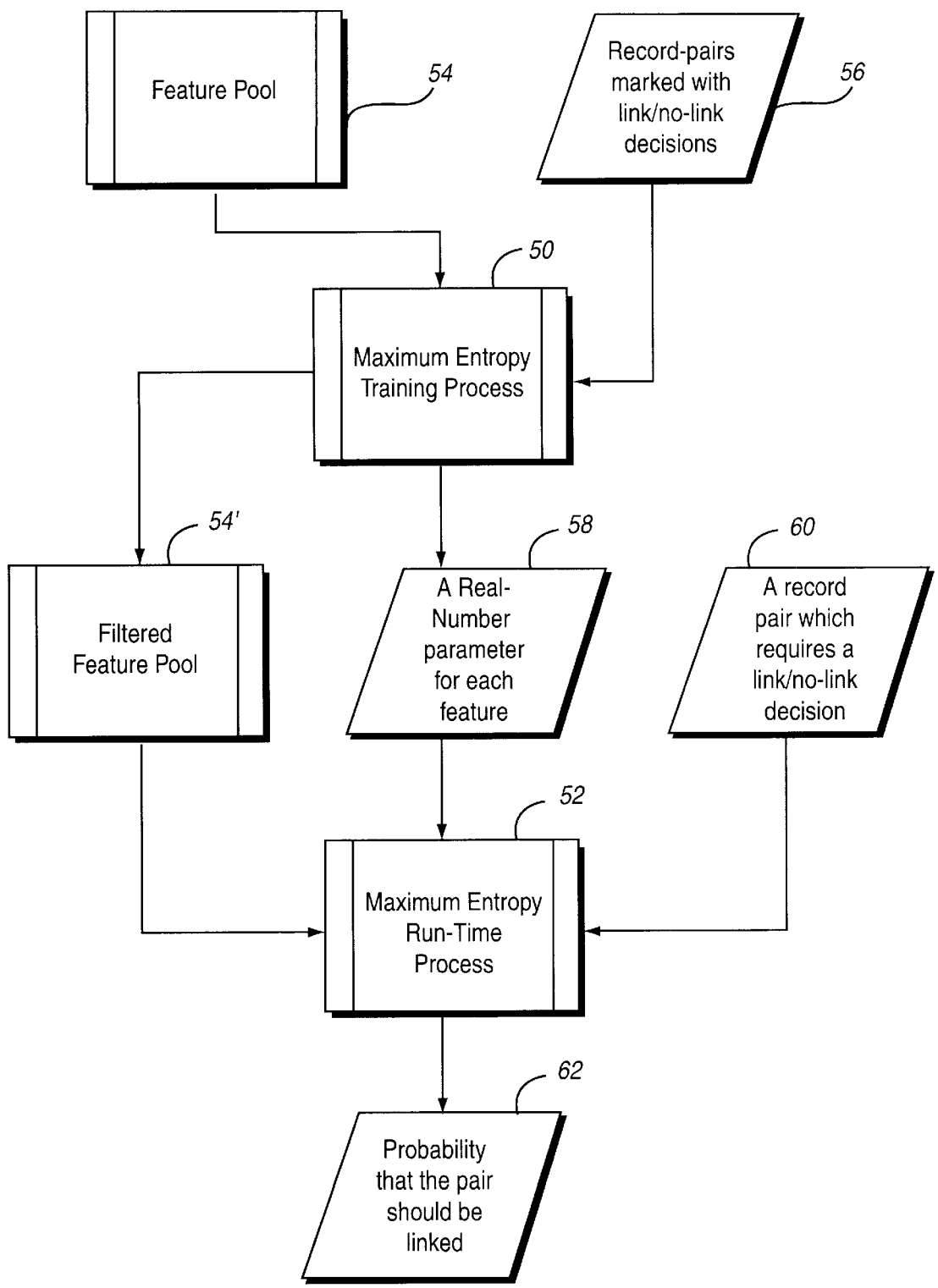
FIG. 2A Top-Level System View

Sample Record Linkage Feature
(A feature predicting link given an exact match on first name)

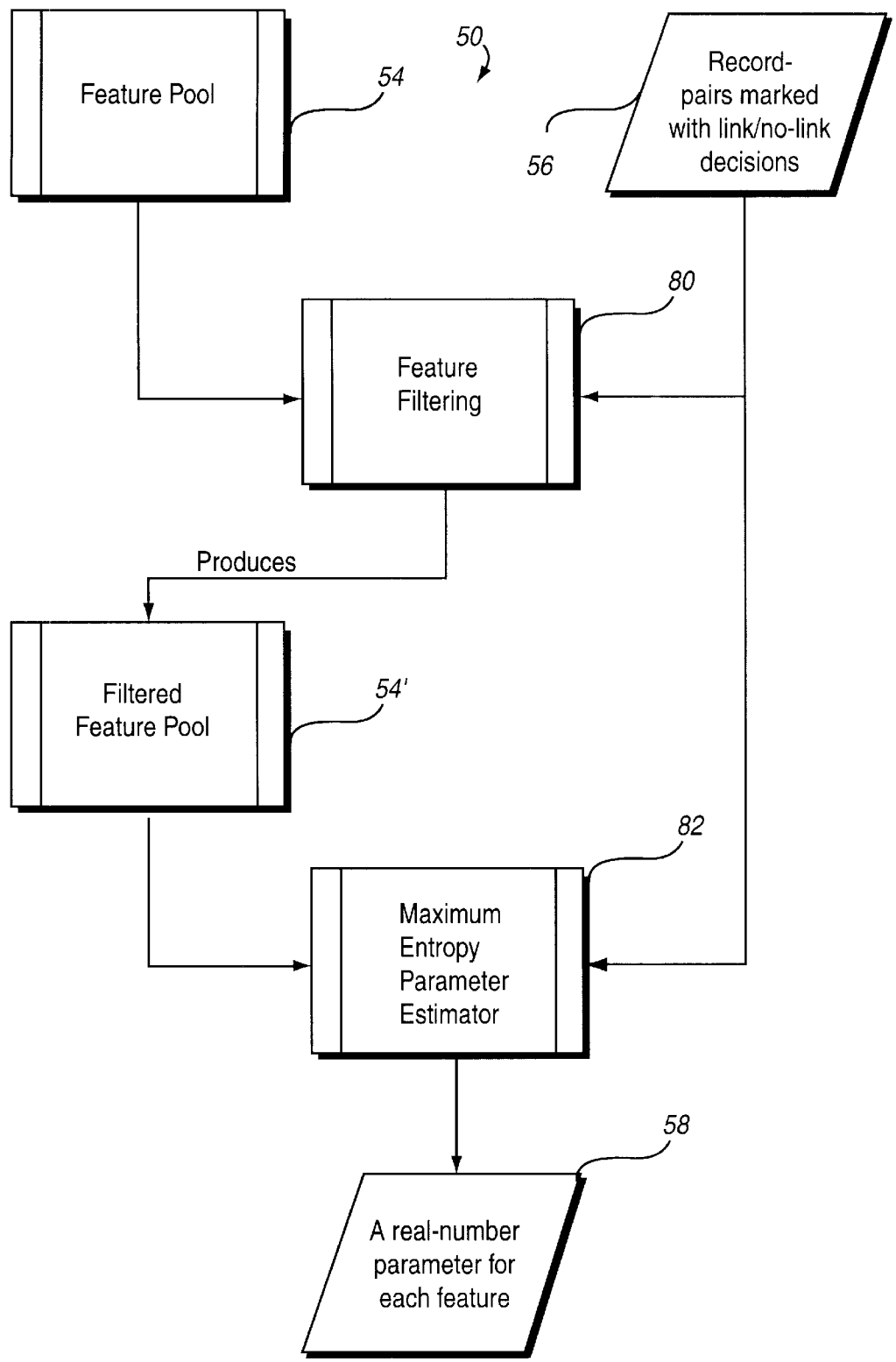
FIG. 2C The Maximum Entropy Training Process
(without file interface)

The Maximum
Entropy Training Process
(with file interface)

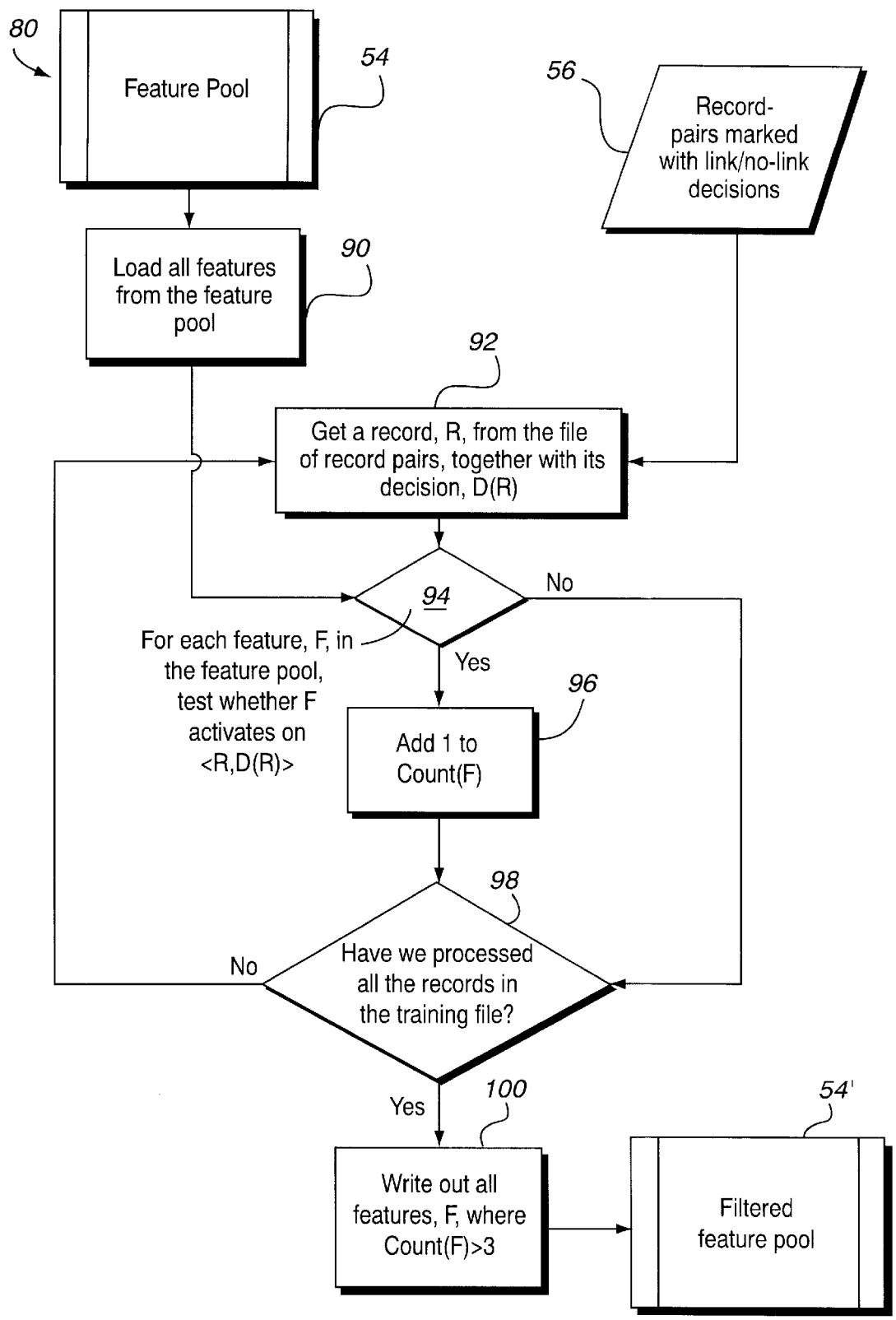
FIG. 2E Feature Filtering
Current Implementation in the MEDD System

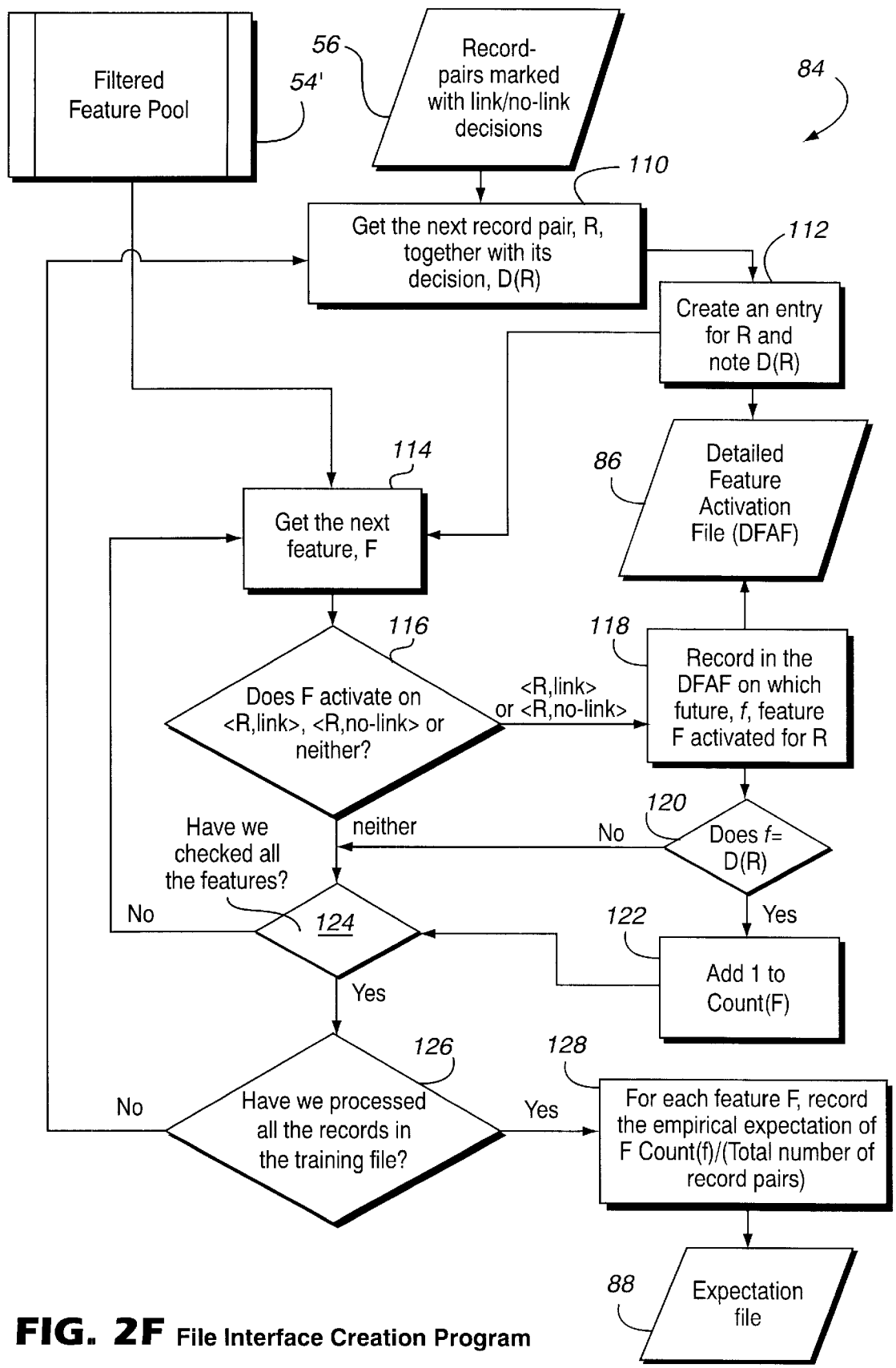
FIG. 2F File Interface Creation Program

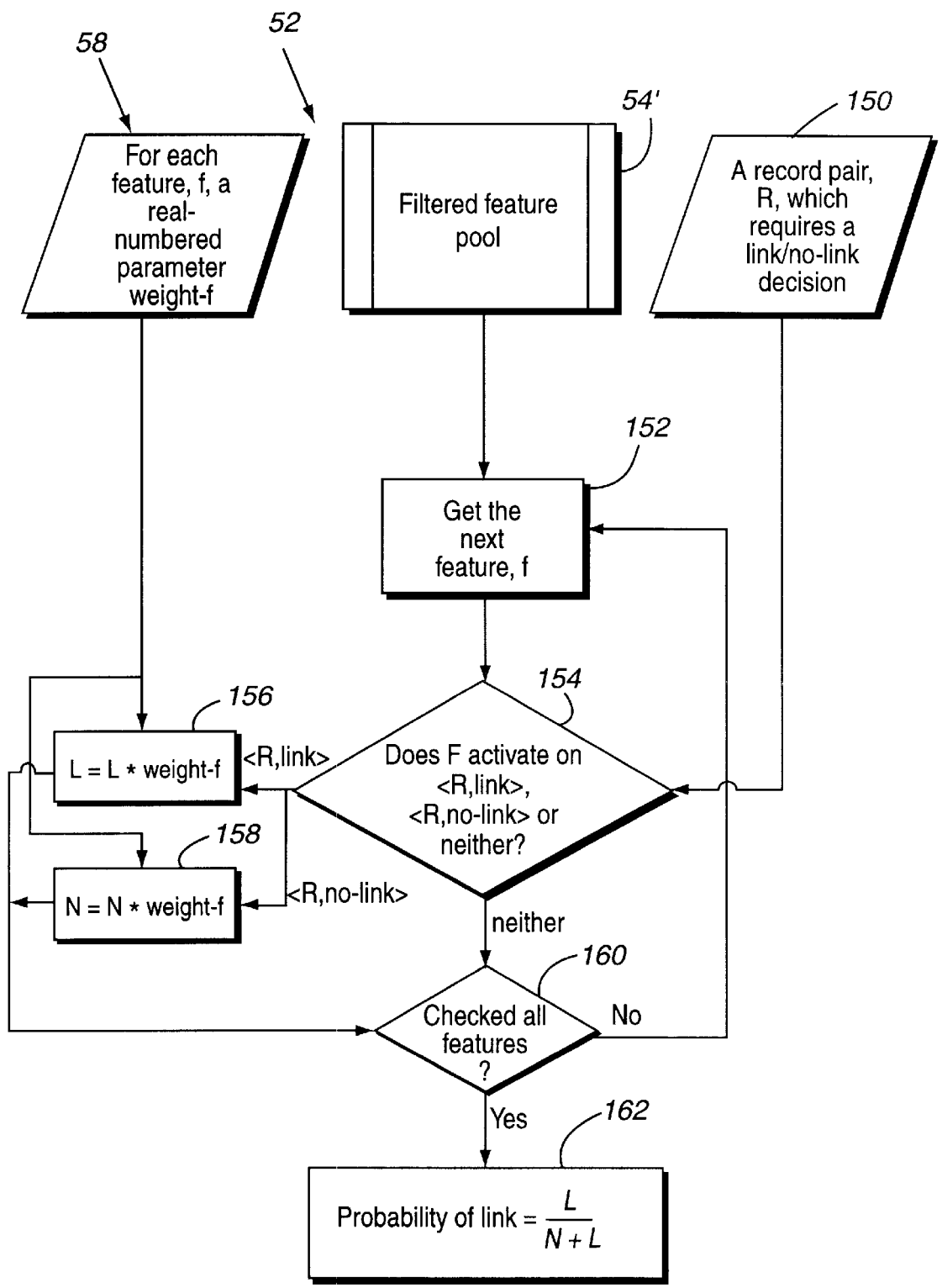
FIG. 2G Maximum Entropy Run-Time Process

Developing and Testing a Model

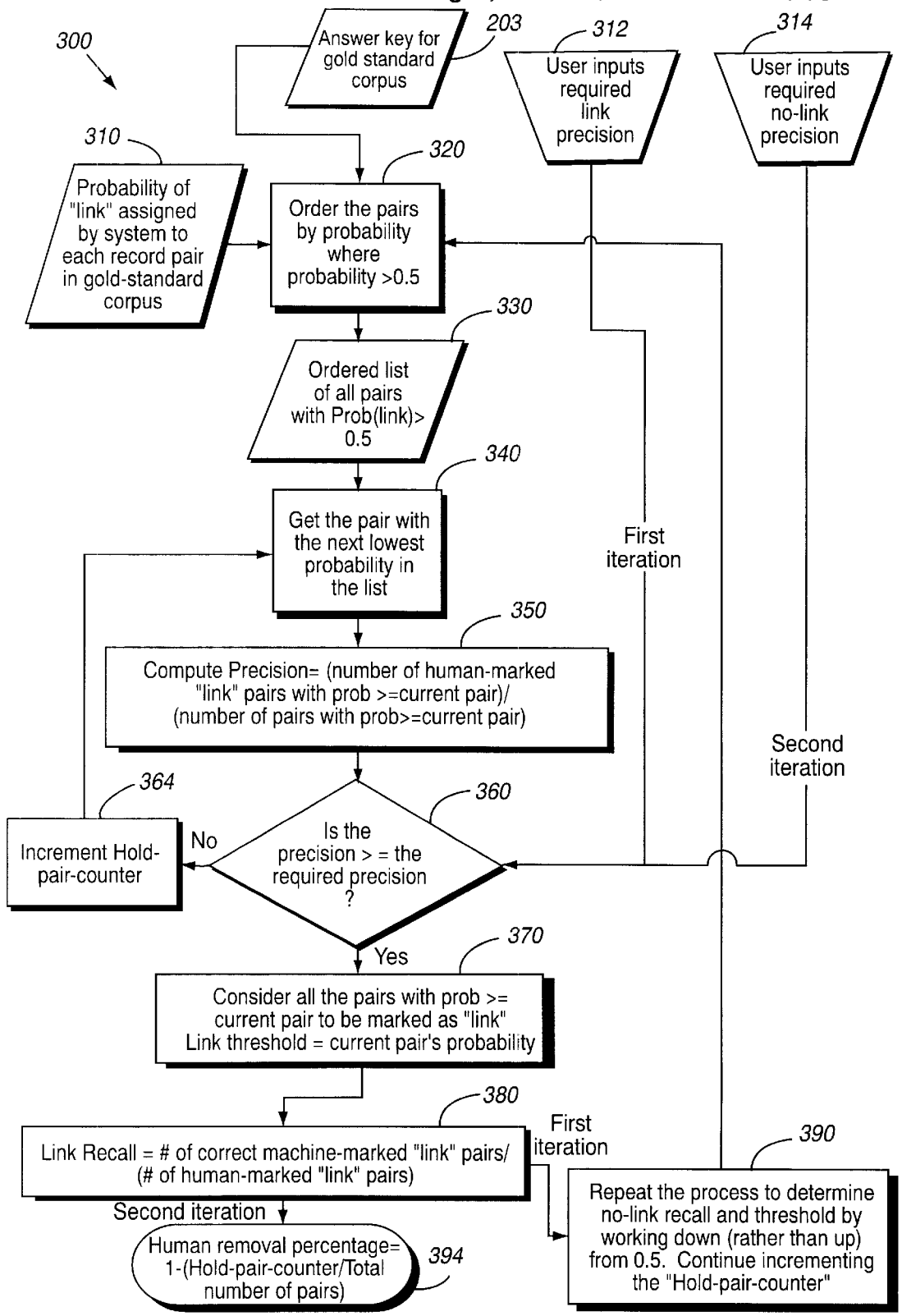
FIG. 2I Computing Human Removal and Precision/Recall Percentages, and Link/No-Link Thresholds

| MEDD Cumulative Merge Side Accuracy | | | | | | | |
|---|---|---|---|---|---|---|---|
| April 13, 1999 System Evaluation | | | | | | | |
| MEDD's Merge Probability | Cumulative Pairs | Cumulative Errors | Cumulative Precision | Cumulative Recall | Non-Cum. Pairs | Non-Cum. Errors | Non-Cum. Precision |
| 100..99 | 750 | 0 | 100.0 | 27.97 | 750 | 0 | 100.00 |
| 99..98 | 929 | 1 | 99.89 | 34.61 | 179 | 1 | 99.44 |
| 98..97 | 1030 | 1 | 99.90 | 38.38 | 101 | 0 | 100.00 |
| 97..96 | 1185 | 6 | 99.49 | 43.98 | 155 | 5 | 96.77 |
| 96..95 | 1243 | 9 | 99.28 | 46.03 | 58 | 3 | 94.83 |
| 95..94 | 1366 | 9 | 99.34 | 50.62 | 123 | 0 | 100.00 |
| 94..93 | 1422 | 9 | 99.37 | 52.70 | 56 | 0 | 100.00 |
| 93..92 | 1527 | 10 | 99.35 | 56.58 | 105 | 1 | 99.05 |
| 92..91 | 2171 | 19 | 99.13 | 80.27 | 644 | 9 | 98.80 |
| 91..90 | 2179 | 19 | 99.13 | 80.57 | 8 | 0 | 100.00 |
| 90..89 | 2182 | 19 | 99.13 | 80.68 | 3 | 0 | 100.00 |
| 89..88 | 2209 | 20 | 99.10 | 81.65 | 27 | 1 | 96.30 |
| 88..87 | 2230 | 22 | 99.01 | 82.36 | 21 | 2 | 90.48 |
| 87..86 | 2238 | 23 | 98.97 | 82.62 | 8 | 1 | 87.50 |
| 86..85 | 2241 | 23 | 98.97 | 82.73 | 3 | 0 | 100.00 |
| 85..84 | 2255 | 24 | 98.94 | 83.22 | 14 | 1 | 92.86 |
| 84..83 | 2302 | 26 | 98.87 | 84.89 | 47 | 2 | 95.75 |
| 83..82 | 2325 | 28 | 98.80 | 85.88 | 23 | 2 | 91.30 |
| 82..81 | 2326 | 28 | 98.80 | 85.71 | 1 | 0 | 100.00 |
| 81..80 | 2359 | 29 | 98.77 | 86.91 | 33 | 1 | 96.97 |
| 80..79 | 2367 | 29 | 98.78 | 87.21 | 8 | 0 | 100.00 |
| 79..78 | 2373 | 31 | 98.69 | 87.36 | 6 | 2 | 66.67 |
| 78..77 | 2374 | 31 | 98.69 | 87.39 | 1 | 0 | 100.00 |
| 77..76 | 2376 | 31 | 98.70 | 87.47 | 2 | 0 | 100.00 |
| 76..75 | 2392 | 34 | 98.58 | 87.95 | 16 | 3 | 81.25 |
| 75..74 | 2393 | 34 | 98.58 | 87.99 | 1 | 0 | 100.00 |
| 74..73 | 2413 | 35 | 98.55 | 88.70 | 20 | 1 | 95.00 |
| 73..72 | 2415 | 35 | 98.55 | 88.77 | 2 | 0 | 100.00 |
| 72..71 | 2415 | 35 | 98.55 | 88.77 | 0 | 0 | 0.00 |
| 71..70 | 2418 | 35 | 98.55 | 88.88 | 3 | 0 | 100.00 |
| 70..69 | 2421 | 35 | 98.55 | 89.00 | 3 | 0 | 100.00 |
| 69..68 | 2444 | 36 | 98.53 | 89.82 | 23 | 1 | 95.65 |
| 68..67 | 2451 | 36 | 98.53 | 90.08 | 7 | 0 | 100.00 |
| 67..66 | 2457 | 37 | 98.49 | 90.26 | 6 | 1 | 83.33 |
| 66..65 | 2461 | 37 | 98.50 | 90.41 | 4 | 0 | 100.00 |
| 65..64 | 2462 | 37 | 98.50 | 90.45 | 1 | 0 | 100.00 |
| 64..63 | 2463 | 38 | 98.46 | 90.45 | 1 | 1 | 0.00 |
| 63..62 | 2464 | 38 | 98.46 | 90.49 | 1 | 0 | 100.00 |
| 62..61 | 2472 | 38 | 98.46 | 90.79 | 8 | 0 | 100.0 |
| 61..60 | 2472 | 38 | 98.46 | 90.79 | 0 | 0 | 0.00 |
| 60..59 | 2477 | 38 | 98.47 | 90.97 | 5 | 0 | 100.00 |
| 59..58 | 2483 | 39 | 98.43 | 91.16 | 6 | 1 | 83.33 |
| 58..57 | 2491 | 40 | 98.39 | 91.42 | 8 | 1 | 87.50 |
| 57..56 | 2495 | 41 | 98.36 | 91.53 | 4 | 1 | 75.00 |
| 56..55 | 2495 | 41 | 98.36 | 91.53 | 0 | 0 | 0.00 |
| 55..54 | 2495 | 41 | 98.36 | 91.53 | 0 | 0 | 0.00 |
| 54..53 | 2496 | 41 | 98.36 | 91.57 | 1 | 0 | 100.00 |
| 53..52 | 2613 | 128 | 95.10 | 92.69 | 117 | 87 | 25.64 |
| 52..51 | 2614 | 128 | 95.10 | 92.73 | 1 | 0 | 100.00 |
| 51..50 | 2614 | 128 | 95.10 | 92.73 | 0 | 0 | 0.00 |

With thresholds set for 98% precision, only 1.4% of records need to be human-reviewed
With thresholds set for 99% precision, only 4% of records need to be human-reviewed

FIG. 3A

| MEDD Cumulative No-Merge Side Accuracy | | | | | | | |
|---|---|---|---|---|---|---|---|
| April 13, 1999 System Evaluation | | | | | | | |
| MEDD's Merge Probability | Cumulative Pairs | Cumulative Errors | Cumulative Precision | Cumulative Recall | Non-Cum. Pairs | Non-Cum. Errors | Non-Cum. Precision |
| 0..1 | 3649 | 0 | 100.00 | 52.38 | 3649 | 0 | 100.00 |
| 1..2 | 3879 | 0 | 100.00 | 55.68 | 230 | 0 | 100.00 |
| 2..3 | 4190 | 1 | 99.98 | 60.13 | 311 | 1 | 99.68 |
| 3..4 | 6448 | 3 | 99.95 | 82.52 | 2258 | 2 | 99.91 |
| 4..5 | 6500 | 7 | 99.89 | 93.21 | 52 | 4 | 92.31 |
| 5..6 | 6542 | 9 | 99.86 | 93.78 | 42 | 2 | 95.24 |
| 6..7 | 6547 | 10 | 99.85 | 93.84 | 5 | 1 | 80.00 |
| 7..8 | 6556 | 10 | 99.85 | 93.97 | 9 | 0 | 100.00 |
| 8..9 | 6602 | 18 | 99.73 | 94.52 | 46 | 8 | 82.51 |
| 9..10 | 6605 | 18 | 99.73 | 94.56 | 3 | 0 | 100.00 |
| 10..11 | 6620 | 19 | 99.71 | 94.76 | 15 | 1 | 93.33 |
| 11..12 | 6668 | 22 | 99.67 | 95.41 | 48 | 3 | 93.75 |
| 12..13 | 6670 | 24 | 99.64 | 95.41 | 2 | 2 | 0.00 |
| 13..14 | 6674 | 27 | 99.60 | 95.42 | 4 | 3 | 25.00 |
| 14..15 | 6676 | 29 | 99.57 | 95.42 | 2 | 2 | 0.00 |
| 15..16 | 6676 | 29 | 99.57 | 95.42 | 0 | 0 | 0.00 |
| 16..17 | 6689 | 31 | 99.54 | 95.58 | 13 | 2 | 84.62 |
| 17..18 | 6691 | 33 | 99.51 | 95.58 | 2 | 2 | 0.00 |
| 18..19 | 6693 | 35 | 99.48 | 95.58 | 2 | 2 | 0.00 |
| 19..20 | 6695 | 37 | 99.45 | 95.58 | 2 | 2 | 0.00 |
| 20..21 | 6701 | 38 | 99.43 | 95.65 | 6 | 1 | 83.33 |
| 21..22 | 6745 | 44 | 99.35 | 96.20 | 44 | 6 | 86.36 |
| 22..23 | 6746 | 45 | 99.33 | 96.20 | 1 | 1 | 0.00 |
| 23..24 | 6746 | 45 | 99.33 | 96.20 | 0 | 0 | 0.00 |
| 24..25 | 6770 | 52 | 99.23 | 96.44 | 24 | 7 | 70.83 |
| 25..26 | 6774 | 54 | 99.20 | 96.47 | 4 | 2 | 50.00 |
| 26..27 | 6782 | 59 | 99.13 | 96.51 | 8 | 5 | 37.50 |
| 27..28 | 6782 | 59 | 99.13 | 96.51 | 0 | 0 | 0.00 |
| 28..29 | 6783 | 59 | 99.13 | 96.53 | 1 | 0 | 100.00 |
| 29..30 | 6784 | 59 | 99.13 | 96.54 | 1 | 0 | 100.00 |
| 30..31 | 6785 | 60 | 99.12 | 96.54 | 1 | 1 | 0.00 |
| 31..32 | 6785 | 60 | 99.12 | 96.54 | 0 | 0 | 0.00 |
| 32..33 | 6790 | 62 | 99.09 | 96.58 | 5 | 2 | 60.00 |
| 33..34 | 6794 | 66 | 99.03 | 96.58 | 4 | 4 | 0.00 |
| 34..35 | 6794 | 66 | 99.03 | 96.58 | 0 | 0 | 0.00 |
| 35..36 | 6796 | 68 | 99.00 | 96.58 | 2 | 2 | 0.00 |
| 36..37 | 6796 | 68 | 99.00 | 96.58 | 0 | 0 | 0.00 |
| 37..38 | 6799 | 71 | 98.96 | 96.58 | 3 | 3 | 0.00 |
| 38..39 | 6799 | 71 | 98.96 | 96.58 | 0 | 0 | 0.00 |
| 39..40 | 6801 | 73 | 98.93 | 96.58 | 2 | 2 | 0.00 |
| 40..41 | 6801 | 73 | 98.93 | 96.58 | 0 | 0 | 0.00 |
| 41..42 | 6801 | 73 | 98.93 | 96.58 | 0 | 0 | 0.00 |
| 42..43 | 6803 | 74 | 98.91 | 96.60 | 2 | 1 | 50.00 |
| 43..44 | 6995 | 163 | 97.67 | 98.08 | 192 | 89 | 53.65 |
| 44..45 | 7009 | 173 | 97.53 | 98.13 | 14 | 10 | 28.57 |
| 45..46 | 7009 | 173 | 97.53 | 98.13 | 0 | 0 | 0.00 |
| 46..47 | 7012 | 176 | 97.49 | 98.13 | 3 | 3 | 0.00 |
| 47..48 | 7017 | 181 | 97.42 | 98.13 | 5 | 5 | 0.00 |
| 48..49 | 7033 | 195 | 97.23 | 98.16 | 16 | 14 | 12.50 |
| 49..50 | 7033 | 195 | 97.23 | 98.16 | 0 | 0 | 0.00 |

FIG. 3B

Sample MEDD Decision
High Probability

Human Decision : MERGE

RECORD 1

| | | | | | |
|---|---|---|---|---|---|
| facility_code : | 1302P01 | | | | |
| last_name : | LOPEZ | first_name: | JOHN JEREMIAH | | |
| dob: [ 01/03/97 ] | gender: M | multiple birth? N | | | |
| mothersmaidenname: | SIMMONS | mothersdob: | [00/00/00] | | |
| house # : | street: | 60 HALSEY STREET | | | |
| city: BROOKLYN | state: NY | zip: 11216 | phone: 718-789-3630 | | |
| key [ 0 ] = | MEDICAID | data [ 0 ] = | UU34064J | | |
| key [ 1 ] = | MEDRCD | data [ 1 ] = | 31354 | | |
| key [ 2 ] = | MEDRCD | data [ 2 ] = | 313544 | | |
| fatherslastname: | JOHNNY fathersfirstname: LOPEZ | | | | |
| motherslastname: | mothersfirstname: | | | | |
| guardianslastname: | guardiansfirstname: | | | | |
| HPB: | [ 01/27/97 ] | [ 00/00/00 ] | [ 00/00/00 ] | [ 00/00/00 ] | |
| DTP: | [ 02/24/97 ] | [ 01/06/98 ] | [ 00/00/00 ] | [ 00/00/00 ] | |
| HIB: | [ 02/24/97 ] | [ 01/06/98 ] | [ 00/00/00 ] | [ 00/00/00 ] | |
| POL: | [ 02/24/97 ] | [ 00/00/00 ] | [ 00/00/00 ] | [ 00/00/00 ] | |
| MMR: | [ 01/06/98 ] | [ 00/00/00 ] | [ 00/00/00 ] | [ 00/00/00 ] | |
| VAR: | [ 03/31/98 ] | [ 00/00/00 ] | [ 00/00/00 ] | [ 00/00/00 ] | |

RECORD 2

| | | | | | |
|---|---|---|---|---|---|
| facility_code : | 1302P01 | | | | |
| last_name : | LOPEZ | first_name: | JOHN | JEREMIAH | |
| dob: [ 01/03/97 ] | gender: M | multiple birth? N | | | |
| mothersmaidenname: | SIMMONS | mothersdob: | [06/19/74] | | |
| house # : 620 | street: | GREENE AV | | | |
| city: BROOKLYN | state: NY | zip: 11216 | phone: - - | | |
| key [ 0 ] = | MEDICAID | data [ 0 ] = | UU34064J | | |
| key [ 1 ] = | MEDRCD | data [ 1 ] = | 126915 | | |
| key [ 2 ] = | MEDRCD | data [ 2 ] = | 313544 | | |
| key [ 3 ] = | VITAL | data [ 3 ] = | 126915 | | |
| fatherslastname: | JOHNNY fathersfirstname: LOPEZ | | | | |
| motherslastname: mothersfirstname: | | | | | |
| guardianslastname: | guardiansfirstname: | | | | |
| HPB: | [ 01/27/97 ] | [ 02/26/97 ] | [ 06/24/97 ] | [ 08/19/97 ] | |
| DTP: | [ 02/26/97 ] | [ 04/22/97 ] | [ 06/24/97 ] | [ 08/19/97 ] | |
| HIB: | [ 02/26/97 ] | [ 04/22/97 ] | [ 06/24/97 ] | [ 08/19/97 ] | |
| POL: | [ 02/26/97 ] | [ 04/22/97 ] | [ 06/24/97 ] | [ 08/19/97 ] | |
| MMR: | [ 00/00/00 ] | [ 00/00/00 ] | [ 00/00/00 ] | [ 00/00/00 ] | |
| VAR: | [ 00/00/00 ] | [ 00/00/00 ] | [ 00/00/00 ] | [ 00/00/00 ] | |

| MEDD Feature | Weight | Firing Criteria | Decision |
|---|---|---|---|
| Birthday | 1.08748 | match child | merge |
| ZipCode | 3.12582 | match | merge |
| Medicaid | 6.16877 | match | merge |
| MedicalRecordNum | 6.6546 | match | merge |
| GivenName | 10.2512 | match first | merge |
| GivenName | 0.838413 | no_match middle | no_merge |
| HouseNumber | 3.07451 | no_match | no_merge |

Totals:
merge  1430.5  no_merge:  2.6     Merge prob:  1430.5/(1430.5 + 2.6) = 0.998
MEDD predicts  I Merge I  with 99.8% confidence

FIG. 3C

Sample MEDD Decision
Low Probability
Human Decision : NO-MERGE

RECORD 1

| | | | |
|---|---|---|---|
| facility_code : | 1318Y99 | | |
| last_name : LOPEZ | first_name: | GIRL | |
| dob: [ 01/11/97 ] | gender: F | multiple birth? N | |
| mothersmaidenname: LOPEZ | | mothersdob: | [00/00/00] |
| house # : 395 street: | CORNELIA | | |
| city: BKLYN state: | NY zip: | 11221 phone: | 718-674-4576 |
| key [ 0 ] = | MEDRCD | data [ 0 ] = | 1001502 |
| key [ 1 ] = | 1318Y99 | data [ 1 ] = | 1001502 |
| fatherslastname: | VALERIE fathersfirstname: LOPEZ | | |
| motherslastname: | mothersfirstname: | | |
| guardianslastname: | guardiansfirstname: | | |
| HPB: [ 01/11/97 ] | [ 00/00/00 ] | [ 00/00/00 ] | [ 00/00/00 ] |
| DTP: [ 00/00/00 ] | [ 00/00/00 ] | [ 00/00/00 ] | [ 00/00/00 ] |
| HIB: [ 00/00/00 ] | [ 00/00/00 ] | [ 00/00/00 ] | [ 00/00/00 ] |
| POL: [ 00/00/00 ] | [ 00/00/00 ] | [ 00/00/00 ] | [ 00/00/00 ] |
| MMR: [ 00/00/00 ] | [ 00/00/00 ] | [ 00/00/00 ] | [ 00/00/00 ] |
| VAR: [ 00/00/00 ] | [ 00/00/00 ] | [ 00/00/00 ] | [ 00/00/00 ] |

RECORD 2

| | | | |
|---|---|---|---|
| facility_code : | 1300P01 | | |
| last_name : LOPEZ | first_name: | TIFFANY | |
| dob: [ 01/02/97 ] | gender: F | multiple birth? N | |
| mothersmaidenname: LOPEZ | | mothersdob: | [00/00/00] 3 |
| house # : 489 street: | THROOP | | |
| city: BKLYN state: | NY zip: | 11221 phone: | 718-553-5705 |
| key [ 0 ] = | MEDRCD | data [ 0 ] = | 566487 |
| key [ 1 ] = | 1300P01 | data [ 1 ] = | 566487 |
| fatherslastname: | MADELINE | fathersfirstname: | LOPEZ |
| motherslastname: | mothersfirstname: | | |
| guardianslastname: | guardiansfirstname: | | |
| HPB: [ 01/06/97 ] | [ 00/00/00 ] | [ 00/00/00 ] | [ 00/00/00 ] |
| DTP: [ 00/00/00 ] | [ 00/00/00 ] | [ 00/00/00 ] | [ 00/00/00 ] |
| HIB: [ 00/00/00 ] | [ 00/00/00 ] | [ 00/00/00 ] | [ 00/00/00 ] |
| POL: [ 00/00/00 ] | [ 00/00/00 ] | [ 00/00/00 ] | [ 00/00/00 ] |
| MMR: [ 00/00/00 ] | [ 00/00/00 ] | [ 00/00/00 ] | [ 00/00/00 ] |
| VAR: [ 00/00/00 ] | [ 00/00/00 ] | [ 00/00/00 ] | [ 00/00/00 ] |

| MEDD Feature | Weight | Firing Criteria | Decision |
|---|---|---|---|
| ZipCode | 3.12582 | match | merge |
| Birthday | 30.9026 | no_match child | no_merge |
| Phone | 2.26072 | no_match | no_merge |
| HouseNumber | 3.07451 | no_match | no_merge |

Totals: merge: 3.1  no_merge: 214.8  Merge prob: 3.1/(3.1 + 214.8) = 0.014
MEDD predicts No-Merge with 98.6% confidence

FIG. 3D

**Sample MEDD Decision
Intermediate Probability**

Human Decision : MERGE

RECORD 1 facility_code :         1176P01
last_name :     HERNANDEZ     first_name:     BOY
dob:     [ 02/14/97 ]     gender:    M     multiple birth?   N
mothersmaidenname:                mothersdob:        [11/04/78]
house # : 1397     street:    GRAND AVE                             1
city:     BRONX     state:    NY     zip:     10468     phone:   718-933-1428
key [ 0 ] =                MEDICAID     data [ 0 ] =        UQ62685E
key [ 1 ] =                MEDRCD         data [ 1 ] =        B00250575
key [ 2 ] =                1176P01          data [ 2 ] =        B00250575
fatherslastname:       ISMELDA          fathersfirstname:   HERNANDEZ
motherslastname:      mothersfirstname:
guardianslastname:    guardiansfirstname:
HPB:    [ 02/14/97 ]    [ 00/00/00 ]    [ 00/00/00 ]    [ 00/00/00 ]
DTP:    [ 00/00/00 ]    [ 00/00/00 ]    [ 00/00/00 ]    [ 00/00/00 ]
HIB:    [ 00/00/00 ]    [ 00/00/00 ]    [ 00/00/00 ]    [ 00/00/00 ]
POL:    [ 00/00/00 ]    [ 00/00/00 ]    [ 00/00/00 ]    [ 00/00/00 ]
MMR:   [ 00/00/00 ]    [ 00/00/00 ]    [ 00/00/00 ]    [ 00/00/00 ]

RECORD 2 facility_code :         1176C02
last_name :     HERNANDEZ     first_name:     KEVIN
dob:     [ 02/14/97 ]     gender:    M     multiple birth?   N
mothersmaidenname:    HERNANDEZ          mothersdob:        [00/00/00]
house # : 1397     street:    GRAND AVE                             F
city:     BRONX     state:    NY     zip:     10457     phone:   718-295-4664
key [ 0 ] =                data [ 0 ] =
key [ 1 ] =                data [ 1 ] =
fatherslastname:       fathersfirstname:
motherslastname:      mothersfirstname:
guardianslastname:    guardiansfirstname:
HPB:    [ 03/26/97 ]    [ 05/05/97 ]    [ 05/14/97 ]    [ 00/00/00 ]
DTP:    [ 03/26/97 ]    [ 05/05/97 ]    [ 00/00/00 ]    [ 00/00/00 ]
HIB:    [ 03/26/97 ]    [ 05/05/97 ]    [ 00/00/00 ]    [ 00/00/00 ]
POL:    [ 03/26/97 ]    [ 05/05/97 ]    [ 00/00/00 ]    [ 00/00/00 ]
MMR:   [ 00/00/00 ]    [ 00/00/00 ]    [ 00/00/00 ]    [ 00/00/00 ]

| MEDD Feature | Weight | Firing Criteria | Decision |
|---|---|---|---|
| Birthday | 1.08748 | match child | merge |
| HouseNumber | 4.99256 | match | merge |
| ZipCode | 2.65795 | no_match | no_merge |
| Phone | 2.26072 | no_match | no_merge |

Totals:
merge: 5.4    no_merge: 6.0    Merge prob: 5.4/(5.4 + 6.0) = 0.475
MEDD predicts  I No-Merge I  with 52.5% confidence and is wrong!

FIG. 3E

PROBABILISTIC RECORD LINKAGE MODEL DERIVED FROM TRAINING DATA

CROSS-REFERENCE TO RELATED APPLICATIONS

Priority is claimed from my U.S. provisional application No. 60/155,063 filed Sep. 21, 1999 entitled "A Probabalistic Record Linkage Model Derived from Training Data", the entirety of which is incorporated herein by reference.

FIELD OF THE INVENTION

The present invention relates to computerized data and retrieval, and more particularly to techniques for determining whether stored data items should be linked or merged. More specifically, the present invention relates to making use of maximum entropy modeling to determine the probability that two different computer database records relate to the same person, entity, and/or transaction.

BACKGROUND AND SUMMARY OF THE INVENTION

Computers keep and store information about each of us in databases. For example, a computer may maintain a list of a company's customers in a customer database. When the company does business with a new customer, the customer's name, address and telephone number is added to the database. The information in the database is then used for keeping track of the customer's orders, sending out bills and newsletters to the customer, and the like.

Maintaining large databases can be difficult, time consuming and expensive. Duplicate records create an especially troublesome problem. Suppose for example that when a customer named "Joseph Smith" first starts doing business with an organization, his name is initially inputted into the computer database as "Joe Smith". The next time he places an order, however, the sales clerk fails to notice or recognize that he is the same "Joe Smith" who is already in the database, and creates a new record under the name "Joseph Smith". A still further transaction might result in a still further record under the name "J. Smith." When the company sends out a mass mailing to all of its customers, Mr. Smith will receive three copies—one to "Joe Smith", another addressed to "Joseph Smith", and a third to "J. Smith." Mr. Smith may be annoyed at receiving several duplicate copies of the mailing, and the business has wasted money by needlessly printing and mailing duplicate copies.

It is possible to program a computer to eliminate records that are exact duplicates. However, in the example above, the records are not exact duplicates, but instead differ in certain respects. It is difficult for the computer to automatically determine whether the records are indeed duplicates. For example, the record for "J. Smith" might correspond to Joe Smith, or it might correspond to Joe's teenage daughter Jane Smith living at the same address. Jane Smith will never get her copy of the mailing if the computer is programmed to simply delete all but one "J_Smith." Data entry errors such as misspellings can cause even worse duplicate detection problems.

There are other situations in which different computer records need to be linked or matched up. For example, suppose that Mr. Smith has an automobile accident and files an insurance claim under his full name "Joseph Smith." Suppose he later files a second claim for another accident under the name "J. R. Smith." It would be helpful if a computer could automatically match up the two different claims records—helping to speed processing of the second claim, and also ensuring that Mr. Smith is not fraudulently attempting to get double recovery for the same accident.

Another significant database management problem relates to merging two databases into one. Suppose one company merges with another company and now wants to create a master customer database by merging together existing databases from each company. It may be that some customers of the first company were also customers of the second company. Some mechanism should be used to recognize that two records with common names or other data are actually for the same person or entity.

As illustrated above, records that are related to one another are not always identical. Due to inconsistencies in data entry or for other reasons, two records for the same person or transaction may actually appear to be quite different (e.g., "Joseph Braun" and "Joe Brown" may actually be the same person). Moreover, records that may appear to be nearly identical may actually be for entirely different people and/or transactions (e.g., Joe Smith and his daughter Jane). A computer programmed to simply look for near or exact identity will fail to recognize records that should be linked, and may try to link records that should not be linked.

One way to solve these problems is to have human analysts review and compare records and make decisions as to which records match and which ones don't. This is an extremely time-consuming and labor-intensive process, but in critical applications (e.g., the health professions) where errors cannot be tolerated, the high error rates of existing automatic techniques have been generally unacceptable. Therefore, further improvements are possible.

The present invention solves this problem by providing a method of training a system from examples that is capable of achieving very high accuracy by finding the optimal weighting of the different clues indicating whether two records should be matched or linked. The trained system provides three possible outputs when presented with two records: "yes" (i.e., the two records match and should be linked or merged); "no" (i.e., the two records do not match and should not be linked or merged); or "I don't know" (human intervention and decision making is required). Registry management can make informed effort versus accuracy judgments, and the system can be easily tuned for peculiarities in each database to improve accuracy.

In more detail, the present invention uses a statistical technique known as "maximum entropy modeling" to determine whether two records should be linked or matched. Briefly, given a set of pairs of records, which each have been marked with a reasonably reliable "link" or "non-link" decision (the training data), the technique provided in accordance with the present invention builds a model using "Maximum Entropy Modeling" (or a similar technique) which will return, for a new pair of records, the probability that those two records should be linked. A high probability of linkage indicates that the pair should be linked. A low probability indicates that the pair should not be linked. Intermediate probabilities (i.e. pairs with probabilities close to 0.5) can be held for human review.

In still more detail, the present invention provides a process for linking records in one or more databases whereby a predictive model is constructed by training said model using some machine learning method on a corpus of record pairs which have been marked by one or more persons with a decision as to that person's degree of certainty that the record pair should be linked. The predictive model may then be used to predict whether a further pair of records should be linked.

In accordance with another aspect of the invention, a process for linking records in one or more databases uses different factors to predict a link or non-link decision. These different factors are each assigned a weight. The equation Probability=L/(L+N) is formed, where L is the product of all features indicating link, and N is the product of all features indicating no-link. The calculated link probability is used to decide whether or not the records should be linked.

In accordance with a further aspect provided by the invention, the predictive model for record linkage is constructed using the maximum entropy modeling technique and/or a machine learning technique.

In accordance with a further aspect provided by the invention, a computer system can automatically take action based on the link/no-link decision. For example, the two or more records can automatically be merged or linked together; or an informational display can be presented to a data entry person about to create a new record in the database.

The techniques provided in accordance with the present invention have potential applications in a wide variety of record linkage, matching and/or merging tasks, including for example:

Removal of duplicate records from an existing database ("De-duplication") such as by generating possible matches with database queries looking for matches on fields like first name, last name and/or birthday;

Fraud detection through the identification of health-care or governmental claims which appear to be submitted twice (the same individual receiving two Welfare checks or two claims being submitted for the same medical service);

The facilitation of the merging of multiple databases by identifying common records in the databases;

Techniques for linking records which do not indicate the same entity (for instance, linking mothers and daughters in health-care records for purposes of a health-care study); and Accelerating data entry (e.g., automatic analysis at time of data entry to return the existing record most likely to match the new entry—thus reducing the potential for duplicate entries before they are inputted, and saving data entry time by automatically calling up a likely matching record that is already in the system).

BRIEF DESCRIPTION OF THE DRAWINGS

These and other features and advantages provided by the present invention will be better and more completely understood by referring to the following detailed description of preferred embodiments in conjunction with the drawings of which:

FIG. 2A is a flowchart of example top-level system view steps;

FIG. 2C is a flowchart of an example maximum entropy training process without file interface;

FIG. 2E is a flowchart of example feature filtering steps;

FIG. 2F is a flowchart of example file interface creation program steps;

FIG. 2G is a flowchart of example maximum entropy run-time process steps;

FIG. 2I is a flowchart of example computing human removal and precision/recall percentages, and link/no-link thresholds steps;

FIG. 3A shows example test result data for cumulative merge side accuracy;

FIG. 3B shows example test result data for cumulative no-merge side accuracy;

FIG. 3C shows example test result data for sample MEDD decision high probability;

FIG. 3D shows example test result data for sample MEDD decision low probability; and FIG. 3E shows example test results data for example MEDD decision intermediate probability.

DETAILED DESCRIPTION OF THE PRESENTLY PREFERRED EXAMPLE EMBODIMENTS

Figure 1:
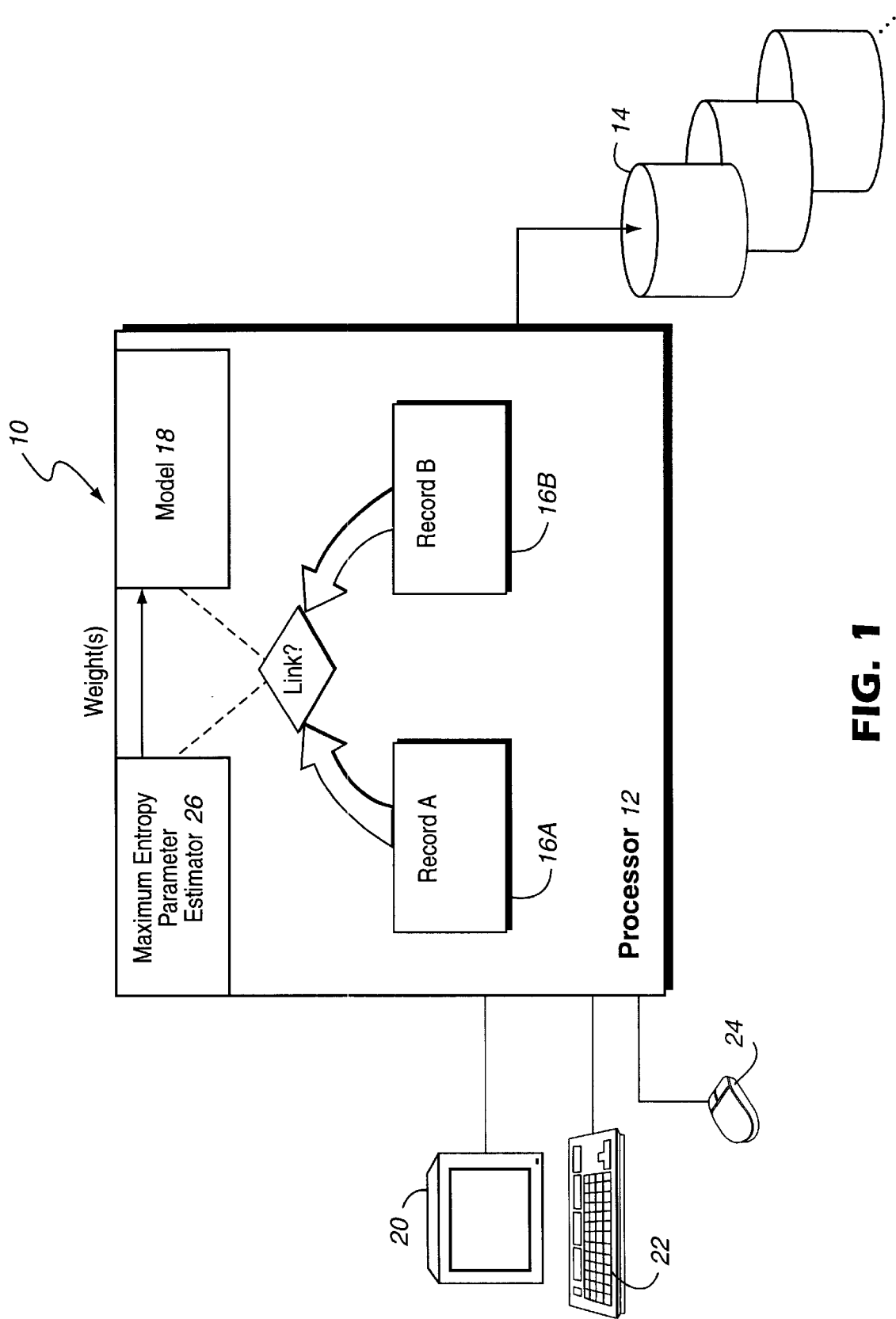
FIG. 1 is an overall block diagram of a computer record analysis system provided in accordance with the present invention.

FIG. 1 is an overall block diagram of a computer record analysis system 10 in accordance with the present invention. System 10 includes a computer processor 12 coupled to one or more computer databases 14. Processor 12 is controlled by software to retrieve records 16a and 16b from database(s) 14, and analyze them based on a learning-generated model 18 to determine whether or not the records match or should otherwise be linked.

In the preferred embodiment, the same or different processor 12 may be used to generate model 18 through training from examples. As one example, records 16 retrieved from database(s) 14 can be displayed on a display device 20 (or otherwise rendered in human-readable form) so a human can decide the likelihood that the two records match or should be linked. The human indicates this matching/linking likelihood to the processor 12—for example, by inputting information into the processor 12 via a keyboard 22 and/or other input device 24. Once model 18 has "learned" sufficient information about database(s) 14 and matching criteria through this human input, processor 12 can use the model to automatically determine whether additional records 16 should be linked or otherwise match.

In the preferred embodiment, model 18 is based on a maximum entropy model decision making technique providing "features", i.e., functions which predict either "link" or "don't link" given specific characteristics of a pair of records 16. Each feature may be assigned a weight during the training process. Separate features may have separate weights for "link" and "don't link" decisions. For every record pair, system 10 may compute a probability that the pair should be linked. High probabilities indicate a "link" decision. Low probabilities indicate a "don't link" decision. Intermediate probabilities indicate uncertainty that require human intervention and review for a decision.

The functions that can serve as features depend on the nature of the data items being analyzed (and in some cases, on peculiarities in the particular database). In the context of a children's health insurance database, for example, features may include:

match/mismatch of child's birthday/mother's birthday match/mismatch of house number, telephone number, zip code match/mismatch of Medicaid number and/or medical record number presence of multiple birth indicator on one of the records match/mismatch of child's first and middle names (after filtering out generic names like "Baby Boy")

match/mismatch of last name match/mismatch of mother's/father's name approximate matches of any of the name fields where the names are compares using a technique such as the "Soundex" or "Edit Distance" techniques The training process performed by system 10 can be based on a representative number of database records 16a and 16b. System 10 includes a maximum entropy parameter estimator 26 that uses the resulting training data to calculate appropriate weights to assign to each feature. In one example, these weights are calculated to mimic the weights that may be assigned to each feature by a human.

Example Program Controlled Steps for Performing the Invention

FIG. 2A is a flowchart of example steps performed by system 10 in accordance with the present invention. As shown in FIG. 2A, system 10 includes two main processes: a maximum entropy training process 50, and a maximum entropy run-time process 52. The training process 50 and run-time process 52 can be performed on different computers, or they can be performed on the same computer.

The training process 50 takes as inputs, a feature pool 54 and some number of record pairs 56 marked with link/no-link decisions of known reliable accuracy (e.g., decisions made by one or a panel of human decision makers). Training process 50 supplies, to run-time process 52, a real-number parameter 58 for each feature in the feature pool 54. Training process 50 may also provide a filtered feature pool 54' (i.e., a subset of feature pool 54 the training process develops by removing features that are not so helpful in reaching the link/no-link decision).

Run-time process 52 accepts, as an input, a record pair 60 which requires a link/no-link decision. Run-time process 52 also accepts the filtered feature pool 54', and the real number parameter for each feature in the pool. Based on these inputs, run-time process 52 uses a maximum entropy calculation to determine the probability that the two records match. The preferred embodiment computes, based on the weights, the probability that two records should be linked according to the standard maximum entropy formula: Probability=m/(m+n), wherein m is the product of weights of all features predicting a "link" decision, and n is the product of weights of all features predicting a "no link" decision. Run-time process 52 outputs the resulting probability that the pair should be linked (block 62).

Example Training Process

FIG. 2C shows an example maximum entropy training process 50. In this example, a feature filtering process 80 operates on feature pool 54 to produce filtered feature pool 54' which is a subset of feature pool 54. The filtered feature pool 54' is supplied to a maximum entropy parameter estimator 82 that produces weighted values 58 corresponding to each feature within feature pool 54'.

In the preferred embodiment, a "feature" can be expressed as a function, usually binary-valued, (see variation 2 below) which takes two parameters as its arguments. These arguments are known in the maximum-entropy literature as the "history" and "future". The history is the information available to the system as it makes its decision, while the future is the space of options among which the system is trying to choose. In the record-linkage application, the history is the pair of records and the future is generally either "link" or "non-link". When we say that a particular feature "predicts" link, for instance, we mean that the feature is passed a "future" argument of "link" in order to return a value of 1.

Note that both a feature's "history" condition and its "future" condition holds for it to return 1.

Figure 2B:
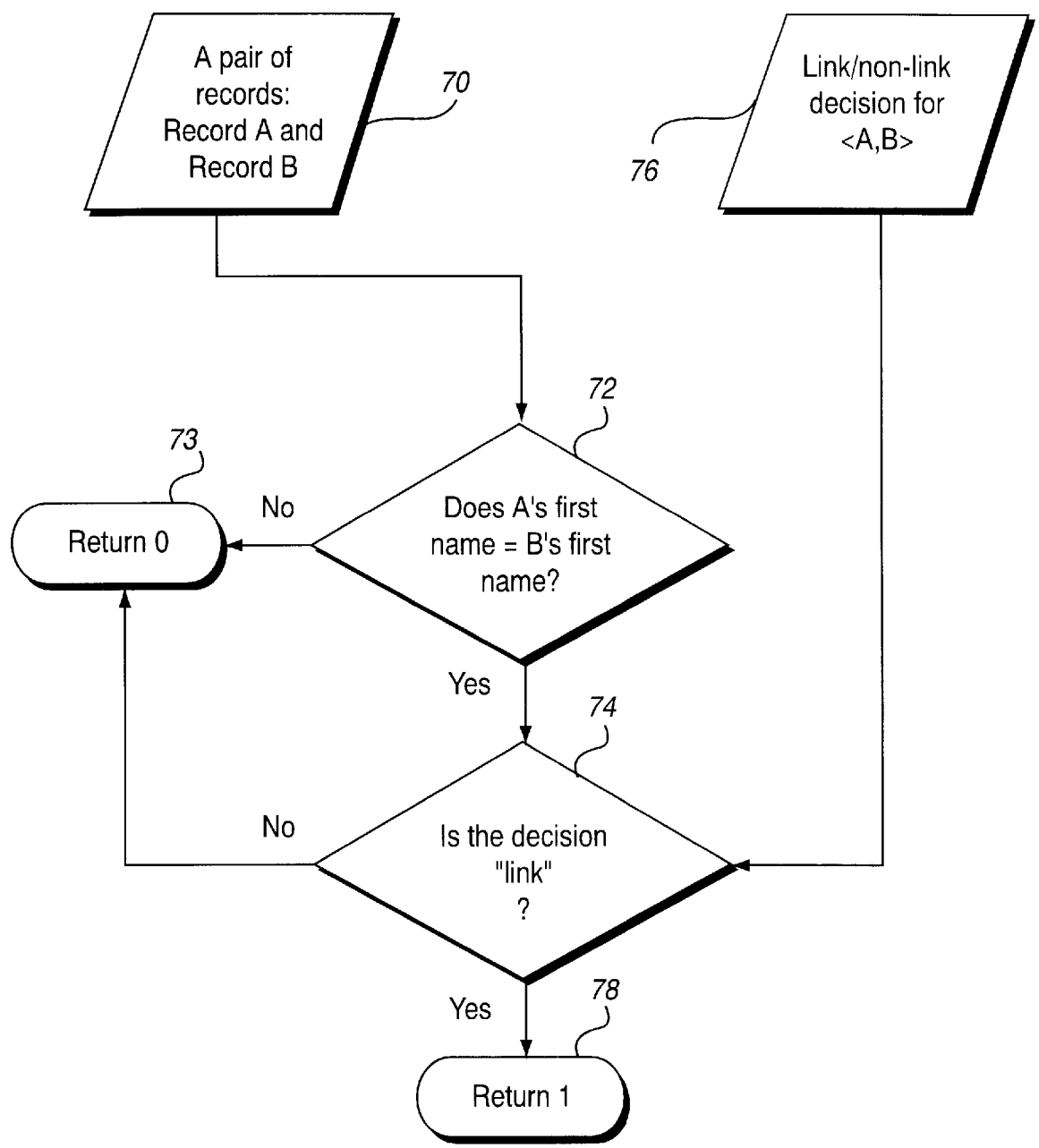
FIG. 2B is a flowchart of example sample record linkage feature steps.

FIG. 2B is a flowchart of a sample record linking feature which might be found in feature pool 54. In this example, the linking feature is the person's first name. In the FIG. 2B example, a pair of records 16a, 16b are inputted (block 70) to a decision that tests whether the first name field of record 16a is identical to the first name field of record 16b (block 72). If the test fails ("no" exit to decision block 72), the process returns a false (block 74). However, if decision 72 determines there is identity ("yes" exit to decision block 72), then a further decision (block 74) determines, based on the future (decision) input (input 76), whether the feature's prediction of "link" causes it to activate. Decision block 74 returns a "false" (block 73) if the decision is to not link, and returns a "true" (block 78) if the decision is to link. Decision block 74 could thus be said to be indicating whether the feature "agrees" with the decision input (input 76). Note that at run-time the feature will, conceptually, be tested on both the "link" and the "no link" futures to determine on which (if either) of the futures it activates (block 154 of FIG. 52). In practice, it is inefficient to test the feature for both the "link" and "no link" futures, so it is best to use the optimization described in Section 4.4.3 of Andrew Borthwick "*A Maximum Entropy Approach to Named Entity Recognition,*" PhD thesis, New York University (1999) (available from the NYU Computer Science Department, and incorporated herein by reference).

Thus, some features may predict "link", and some features may predict "no link." In unusual cases, it is possible for a feature to predict "link" sometimes and "non-link" other times depending on the data passed as the "history". For instance, one could imagine a single feature which would predict "link" if the first names in the record pair matched and "non-link" if the first names differed. I prefer, however, to use two features in this situation, one which predicts "link" given a match on first name and one which predicts "non-link" given a non-match.

Which classes of features will be included in the model will be dependent on the application. For a particular application, one should determine classes of "features" which may be predictive of either a "link" or a "non-link". Note for each feature class whether it predicts a "link" or "non-link" future. Determining the feature classes can be done in many ways including the following:

a) Interview the annotators to determine what factors go into making their link/non-link decisions b) Study the annotators' decisions to infer factors influencing their decision-making process c) Determine which fields most commonly match or don't match in link or non-link records by counting the number of occurrences of the features in the training corpus Examples of features which might be placed in the feature pool of a system designed to detect duplicate records in a medical record database include the following:

a) Exact-first-name-match features (activates predicting "link" if the first name matches exactly on the two records).

b) "Last name match using the Soundex criteria" (an approximate match on last name, where approximate matches are identified using the "Soundex" criteria as described in Howard B. Newcombe, "*Handbook of Record Linkage: Methods for Health and Statistical Studies, Administration, and Business,*" Oxford Medical Publications (1988)). This predicts link.

c) Birthday-mismatch-feature (The birthdays on the two records do not match. This predicts "non-link")

A more comprehensive list of features which I found to be useful in a medical records application can be found in the below section "Example Features"

Note that there might be more than one feature in a given feature class. For instance there might be one exact-first-name-match predicting "link" and an "exact-first-name-mismatch" predicting non-link. Each of these features would be given a separate weight by the maximum entropy parameter estimator described below.

Not all classes of features will lead to an improvement in the accuracy of the model. Feature classes should generally be tested to see if they improve the model's performance on held out data as described in the below section "Testing the Model".

Before proceeding, it is necessary to convert the abstract feature classes into computer code so that for each feature, the system may, in some way, be able to determine whether or not the feature activates on a given "history" and "future" (e.g. a record pair and either "link" or "non-link"). There are many ways to do this, but I recommend the following:

1) Using an object-oriented programming language such as C++, create an abstract base class which has a method "activates-on" which takes as parameters a "history" and a "future" object and returns either 0 or 1
   a) Note the variation below where the feature returns a non-negative real number rather than just 0 or 1
2) Create a "history" base class which can be initialized from a pair of records
3) Represent the "future" class trivially as either 0 or 1 (indicating "non-link" and "link")
4) Create derivative classes from the abstract base class for each of the different classes of features which specialize the "activates-on" method for the criteria specific to the class
   a) For instance, to create an "exact-match-on-first-name-predicts-link" feature, you could write a derivation of the "feature" base class which:
      i) Checked the future parameter to see if it is "1" ("link") [if not, return false]
      ii) Extracted the first names of the two individuals on the two records from the "history" parameter
      iii) Tested the two names to see if they are identical
         (1) If the two names are identical, return true
         (2) Otherwise, return false Feature Filtering (Optional)

FIG. 2E is a flowchart of an example feature filtering process 80. I currently favor this optional step at this point. I discard any feature from the feature pool 54 which activates fewer than three times on the training data, or "corpus." In this step, I assume that we are working with features which are (or could be) implemented as a binary-valued function. I keep a feature if such a function implementing this feature does (or would) return "1" three or more times when passed the history (the record pair) and the future (the human decision) for every item in the training corpus.

There are many other methods of filtering the feature pool, including those found in Adam L. Berger, Stephen A. Della Pietra, Vincent J. Della Pietra, "A Maximum Entropy Approach To Natural Language Processing," *Computational Linguistics,* 22(1):39–71, (1996) and Harry Printz, "Fast Computation Of Maximum Entropy/Minimum Divergence Model Feature Gain," *Proceedings of the Fifth International Conference on Spoken Language Processing* (1998).

In the example embodiment shown in FIG. 2E, all features of feature pool 54 are loaded (block 90) and then the training process 50 proceeds by inputting record pairs marked with link/no-link decisions (block 56). The feature filtering process 80 gets a record R from the file of record pairs together with its link/no-link decision D(R) (Block 92). Then for each feature F in feature pool 90, process 80 tests whether F activates on the pair <R,D(R)> (decision block 94). A loop (block 92, 98) is performed to process all of the records in the training file 56. Then, process 80 writes out all features F where the count (F) is greater than 3 (block 100). These features become the filtered feature pool 54'.

Developing a Maximum Entropy Parameter Estimator

In this example, a file interface creation program is used to develop an interface between the feature classes, the training corpus, and the maximum entropy estimator 82. This interface can be developed in many different ways, but should preferably meet the following two requirements:

1) For every record pair, the estimator should be able to determine which features activate predicting "link" and which activate predicting "no-link". The estimator uses this to compute the probability of "link" and "no-link" for the record pair at each iteration of its training process.

2) The estimator should be able, in some way, to determine the empirical expectation of each feature over the training corpus—except under variation "Not using empirical expectations." Rather than using the empirical expectation of each feature over the training corpus in the Maximum Entropy Parameter Estimator, some other number can be used if the modeler has good reason to believe that the empirical expectation would lead to poor results. An example of how this can be done can be found in Ronald Rosenfeld, "*Adaptive Statistical Language Modeling: A Maximum Entropy Approach,*" PhD thesis, Carnegie Mellon University, CMU Technical Report CMU-CS-94-138 (1994).

An estimator that can determine the empirical expectation of each feature over the training corpus can be easily constructed if the estimator can determine the number of record pairs in the training corpus (T) and the count of the number of empirical activations of each feature, I (count_I), in the corpus by the formula:

$$\text{Empirical expectation} = \frac{\text{count\_i}}{T}$$

Note that the interface 84 to the estimator could either be via a file or by providing the estimator with a method of dynamically invoking the features on the training corpus so that it can determine on which history/future pairs each feature fires.

Figure 2D:
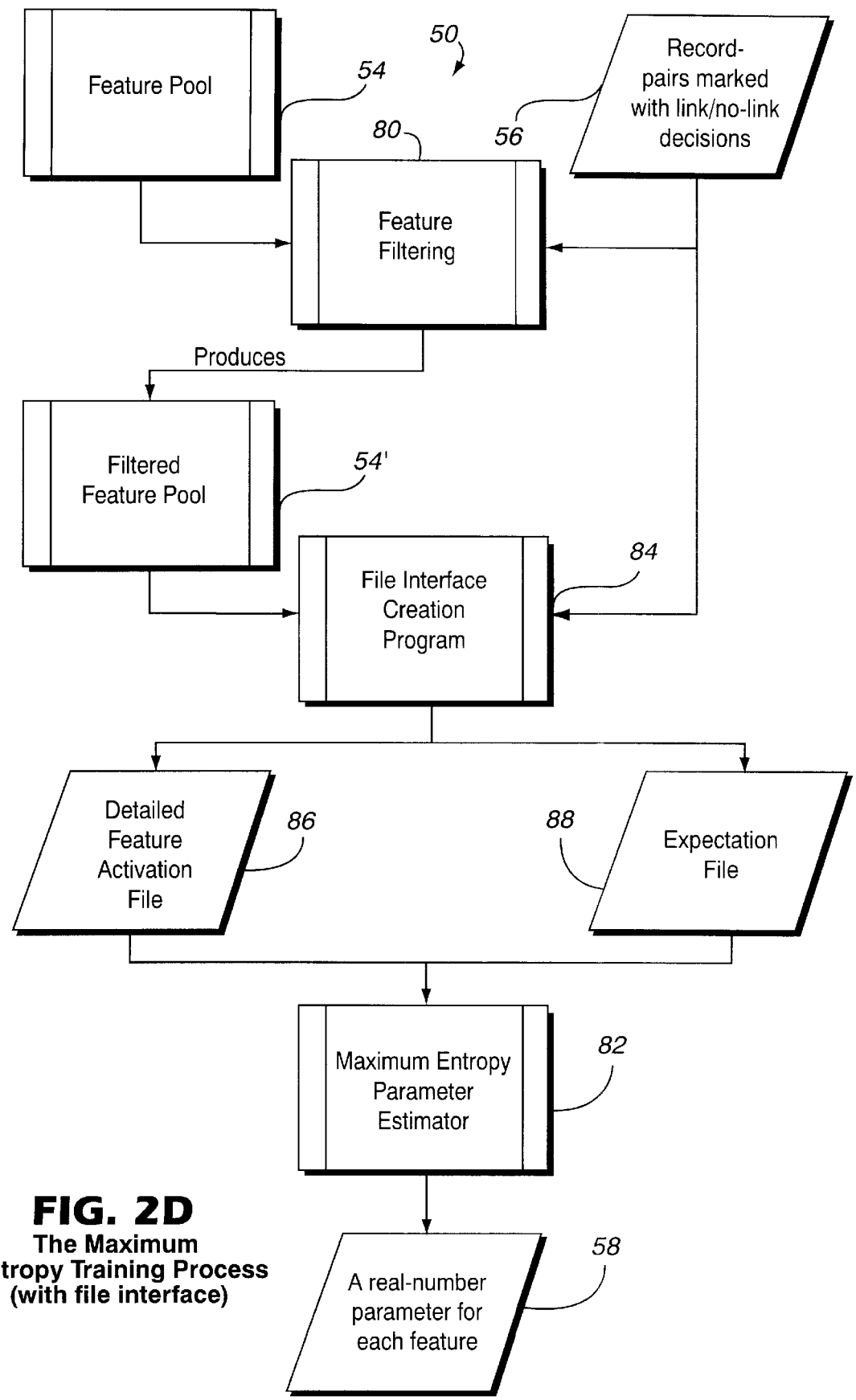
FIG. 2D is a flowchart of an example maximum entropy training process with file interface.

The interface creation method 84 which I currently favor is to create a file interface between the feature classes and the Maximum Entropy Parameter Estimator (the "Estimator"). FIG. 2D is a more detailed version of FIG. 2C discussed above, showing a file interface creation process 84 that creates a detailed feature activation file 86 and an expectation file 88 that are both used by maximum entropy parameter estimator 82. FIG. 2F is a flowchart of an example file interface creation program 84. File interface program 84 accepts the filtered feature pool 54' as an input along with the training records 56, and generates and outputs an expectation file 88 that provides the empirical expectation of each feature over the training corpus. As in intermediate result, process 84 also generates a detailed feature activation file 86. Detailed feature activation file 86 and expectation file 88 are both used to create a suitable maximum entropy parameter estimator 82.

The method described below is an example of a preferred process for creating a file interface:

The first step is to simultaneously determine the empirical expectation of each feature over the training corpus, record the expectation, and record which features activated on each record-pair in the training corpus. This can be done as follows:

1) Assign every feature a number
2) For every record pair in the training corpus 56
   a) Add 1 to a "record-pair" counter
   b) Check every feature to see if it activates when passed the record pair and the annotator's decision (the future) as history and future parameters (blocks 110, 112, 114, 116 of FIG. 2F). If it does, add 1 to the count for that feature (118, 120, 122).
   c) Do the same for the decision rejected by the annotator (e.g. "link" if the annotator chose "non-link") (118, 120, 122).
   d) Write out two lines for the record pair: a "link" line indicating which features activated predicting "link", a "non-link" line indicating which features predicted "non-link", and an indicator on the appropriate line telling which future the annotator chose for that record pair (112, 118). The file written to in this substep can be called the "Detailed Feature Activation File" (DFAF) 86.
3) For each feature
   a) Divide the activation count for that feature by the total number of record pairs to get the empirical expectation of the feature (block 128); and
   b) Write the feature number and the feature's empirical expectation out to a separate "Expectation file" 88.

Constructing a Maximum Entropy Parameter Estimator

Once the interface files described above are obtained, a maximum entropy parameter estimator 82 can be constructed from them. The actual construction of the maximum entropy parameter estimator 82 can be performed using, for example, the techniques described in Adam L. Berger, Stephen A. Della Pietra, Vincent J. Della Pietra, "A Maximum Entropy Approach To Natural Language Processing," *Computational Linguistics,* 22(1):39–71, (1996), Stephen Della Pietra, Vincent Della Pietra, and John Lafferty, "*Inducing Features Of Random Fields,*" Technical Report CMU-CS-95-144, Carnegie Mellon University (1995) and (Borthwick, 1999). These techniques can work by taking in the above-described "Expectation file" 88 and "Detailed Feature Activation File" 86 as parameters. Note that two different methods Improved Iterative Scaling (IIS) and General Iterative Scaling, are described in Borthwick (1999). Either the Improved Iterative Scaling (IIS) method or the General Iterative Scaling methods may achieve the same or similar results, although the IIS method should converge to a solution more rapidly.

The result of this step is that every feature, x, will have associated with it a weight (e.g., weight-x).

Example Run-Time Process

FIG. 2G shows an example maximum entropy run time process 52 that makes use of the maximum entropy parameter estimator's output of a real-number parameter for each feature in the filtered feature pool 54'. These inputs 54', 58 are provided to run time process 52 along with a record pair R which requires a link/no-link decision (block 150). Process 52 gets the next feature f from the filtered feature pool 54' (block 152) and determines whether that feature F activates on <R, link> or on <R, no-link> or neither (decision block 154). If activation occurs on <R link>, process 52 updates a value L to be the product of L and the weight of the feature weight-f (block 156). If, on the other hand, the feature activates on <R, no-link>, then a value N is updated to be the product of N and the weight corresponding to the particular feature weight F (block 158). This process continues until all features in the filtered feature pool 54' have been checked (decision block 160). The probability of linkage is then calculated as:

Probability=$L/(N+L)$(block 162).

In more detail, given a pair of records (x and y) for which you wish to determine whether they should be linked, in some way determine which features activate on the record pair predicting "link" and which features activate predicting "no-link". This is trivial to do if the features are coded using the techniques described above because the feature classes can be reused between the maximum entropy training process (block 50) and the maximum entropy run-time process (block 52). The probability of link can then be determined with the following formula:

$m$=product of weights of all features predicting "link" for the pair $(x,y)$ $n$=product of weights of all features predicting "no-link" for the pair $(x,y)$ Probability of link for $x,y$=$m/(n+m)$ Note that if no features activate predicting "link" or predicting "no-link", then m or n (as appropriate) gets a default weight of "1".

A high probability will generally indicate a "link" decision. A low probability indicates "don't link". An intermediate probability (around 0.5) indicates uncertainty and may require human review.

Developing and Testing a Model

Figure 2H:
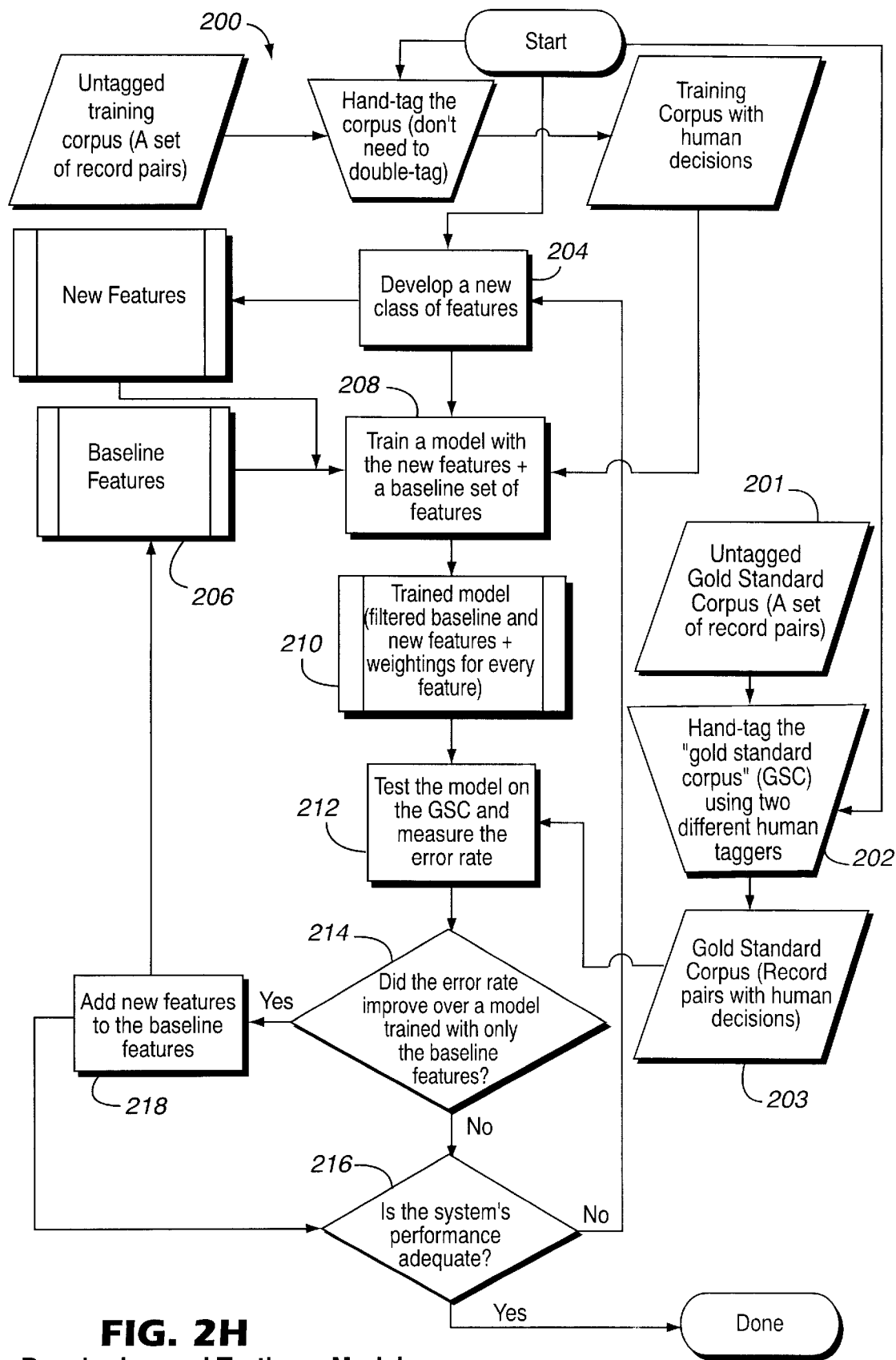
FIG. 2H is a flowchart of example developing and testing a model steps.

As described above, an important part of developing and testing a model 18 is to develop and use a testing corpus of record pairs marked with link/no-link decisions 56. Referring to FIG. 2H, the following procedure describes how one may create such a "training corpus":

1) From the set of databases 14 being merged (or from the single database being de-duplicated), create a list of "possibly linked records". This is a list of pairs of records for which you have some evidence that they should be linked (e.g. for a de-duplication application, the records might share a common first name or a common birthday or the first and last names might be approximately equal).
2) Pass through the list of "possibly linked records" by hand. For each record pair, mark the pair as "link" or "non-link" using the intuition of the annotator. Note that if the annotator is uncertain about a record pair, the pair can be marked as "hold" and removed from the training corpus (although see "Variations" below).
3) Notes on training corpus annotation:
   a) The training corpus does not have to be absolutely accurate. The Maximum Entropy training process will tolerate a certain level of error in its training process. In general, the experience in M.E. modeling (see, for example, M. R. Crystal and F. Kubala, "Studies in Data Annotation Effectiveness," *Proceedings of the DARPA Broadcast News Workshop*(HUB-4), (February, 1999)) has been that it is better to supply the system with "more data" rather than "better data". Specifically, given a choice, one is generally better off having two people tag twice as much data as opposed to having them both tag the same training data and check their results against each other.
   b) The training corpus annotators should be instructed on what degree of certainty they should look for when making their link/non-link decision. For instance, they might be instructed "Link records if you are 99% certain that they should be linked, mark records as "non-link" if you are 95% certain that they should not be linked, mark all other records as 'Hold'".

c) It is best if annotation decisions are made entirely from data available on the record pair. In other words, reference should not be made to information which would not be available to the maximum entropy model. For instance, it would be inadvisable to make a judgement by making a telephone call to the individual listed on one of the records in the pair to ask if he/she is the same person as the individual listed on the other record. If such a phone call needs to be made to make an accurate determination, then the record would likely be marked as "Hold" and removed from the training corpus.

Adding and deleting classes of features is generally something of an experimental process. While it is possible to just rely on the feature filtering methods described in the section "Feature Filtering", I recommend adding classes one at a time by the method shown in the FIG. 2H flowchart:

1. Hand tag a "gold standard test corpus" (block 202). This corpus is one which has been tagged with "link"/"non-link" decisions very carefully (each record pair checked by at least two annotators with discrepancies between the annotators reconciled).

2. Begin by including in the model a "baseline" class (block 206) which you are certain is a useful class of features for making a link/non-link decision. For instance, a class activating on match/mis-match of birthday might be chosen as the baseline class. Train this model built from the baseline feature pool on the training corpus (block 208) and then test it on the gold standard corpus. Record the baseline system's score against the gold standard data created above using the methods discussed below (blocks 210–218).

2.1. Note that there are many different ways of scoring the quality of a run of an M.E. system against a hand-tagged test corpus. A simple method is to consider the M.E. system to have predicted "link" every time it outputs a probability>0.5, and "non-link" for every probability<0.5. By comparing the M.E. system's answers on "gold-standard data" with the human decisions, you can determine how often the system is right or wrong.

2.2. A more sophisticated method, and one of the three methods that I currently favor is the following:

2.2.1. Consider every human response of "link" on a pair of records in the gold-standard-data (GSD) to be an assignment of probability=1 to "link", "non-link" is an assignment of prob.=0, "hold" is an assignment of probability=0.5.

2.2.2. Compute the square of the difference between the probability output by the M.E. system and the "Human probability" for each record pair and accumulate the sum of this squared difference over the GSD.

i. Divide by the number of records in the GSD. This gives you the "Average mean squared difference" (AMSD) between the human response and the M.E. system's response.

b. A second methodology is to compute a "human removal percentage", which is the percentage of records on which system 10 was able to make a "link" or "no-link" decision with a degree of precision specified by the user. This method is described in more detail below.

c. A third methodology is to look at the system's level of recall given the user's desired level of precision. This method is also described below.

2. A lower AMSD is an indicator of a stronger system, so when deciding whether or not to add a feature class to the feature pool, add the class if it leads to a lower AMSD. Alternately, a higher ratio of correct to incorrect answers (if using the metric of section "2.1" above) would also lead to a decision to add the feature class to the feature pool.

Computation of "Human Removal Percentage", "Recall", "Link-threshold", "No-link-threshold"

As mentioned above, a key metric on which we judge the system is the "Human Removal Percentage"—the percentage of record-pairs which the system does not mark as "hold for human review". In other words, these records are removed from the list of record-pairs which have to be human-reviewed. Another key metric is the level of system "recall" achieved given the user's desired level of precision (the formulas for computing "precision" and "recall" are given below and in the below section "Example"). As an intermediate result of this process, the threshold values on which system 10 achieves the user's desired level of precision are computed.

The process (300) proceeds as follows. The system inputs a file (310) of probabilities for each record pair computed by system 10 that the pair should be merged (this file is an aggregation of output 62 from FIG. 2A) along with a human-marked answer key (203). A process (320) combines and orders these system response and answer key files by extracting all pairs from 310 (and their associated keys from 203) such that the probability of link assigned by system 10 is >=0.5. Process 320 then orders these pairs in ascending order of probability, producing file 330. An exception to the above is that, to simplify the computation, process 320 filters out and doesn't pass on to file 330, all record pairs which were human-marked as "hold". A subsequent process (340) takes the lowest probability pair starting with 0.5 from file 330 and identifies its probability, x. Process 350 then computes the percentage of pairs with probability>=x which were human-marked in file 203 as "link". Decision block 360 then performs a check to see if this level of "precision" is >= the user's required level of link precision, 312. If not (the "no" exit from decision block 360), this record is implicitly marked as "hold for human review" and a hold counter is incremented (364). If the set of records which have a likelihood of link>=x have a level of precision which is at least as high as the user's requirement ("yes" exit from block 360), then we consider all of these records to be marked as "link". Furthermore, we record the "link threshold" as being the probability (x) of the current pair (block 370). Next we compute the "link recall" as being the number of pairs marked as "link" in block 370 divided by the total number of human-marked "link" pairs (process 380).

Having processed all the records marked by system 10 with a probability of at least 0.5, we now proceed to do the analogous process with all the records marked as having a probability of less than 0.5 ("First iteration" exit from 380 and process 390). In this second iteration, we will be systematically descending in likelihood from 0.5 rather than ascending from 0.5 and we will be using as the numerator in computation 350, the number human-marked no-link record pairs with probability<=x. Note that in this second iteration, we will have a new level of required precision from the user (input 314). Thus the user may express that he/she has a greater or lesser tolerance for error on the no-link side relative to his/her tolerance on the link side.

After the completion of the second iteration (exit "Second Iteration" from block 380), we compute (process 394) the quantity y=[the number of held record pairs recorded by block 364 divided by the total number of record pairs which reached file 330 in the two iterations] (i.e. not counting the human-marked "hold" records in either the numerator or denominator). We then compute the Human Removal Percentage as being the quantity 1*y.

Thus we have achieved three useful results with this scoring process (300): We have computed the percentage of records on which the system 10 was able to make a decision within the user's precision tolerance (the Human Removal Percentage), we have computed the percentage of human-marked link and no-link records (the recall) which were correctly marked by system 10 with the required level of precision, and finally, as a by-product, we have detected candidate threshold values above which and below which records can be linked/no-linked. Between the threshold values, records should likely be held for human review. Note that there is no guarantee that the user will attain the required level of precision by using these thresholds on new data, but they are reasonable values to use since on this test the thresholds gave the user the minimum number of records for human review given his/her stated precision tolerance. When system 10 is used in production, the user is free to set the thresholds higher or lower.

Variations

The following are some variations on the above method:

1) Using more than two futures:

a) Rather than discarding records marked as "hold" by the annotator, make "hold" a separate future. Hence some features may fire on the "hold" future, but not on the "link" or "non-link" futures.

b) When computing the probability of link we will track three products: "m" and "n" as described above and "h": product of weights of all features predicting "hold" for the pair (x,y). We can then compute the probability of link as follows:

Probability of link for x,y=m/(n+m+h)+[0.5*h/(n+m+h)]

c) The idea here is that with a "hold" decision, the annotator is indicating that he/she thinks that "link" and "non-link" are each roughly 50% probable.

d) This approach could clearly be extended if the annotators marked text with various gradations of uncertainty. E.g. if we had two more tags: "probable link= 0.75", "probable non-link=0.25", then we could define "pl=product of weights of all features predicting probable link", "pnl=product of weights of all features predicting probable non-link", and then we would have:

Probability of link for x,y=m/(n+m+h+pl+pnl)+[0.5*h/(n+m+h+pl+pnl)]+[0.75*pl+/(n+m+h+pl+pnl)]+[0.25*pnl/(n+m+h+pl+pnl)]

2) Non-binary-valued features. Features can return any non-negative real number rather than just 0 and 1. In this case, the probability would be expressed as the fully general maximum entropy formula:

$$P(f \mid h) = \frac{\Pi_i \alpha_i^{g_i(h,f)}}{Z_\alpha(h)}$$

-continued
$$Z_\alpha(h) = \sum_f \Pi_i \alpha_i^{g_i(h,f)}$$

Note here that $\alpha_i$ is the weight of feature $g_i$ and $g_i$ is a function of the history and future returning a non-negative real number.

Non-binary-valued features could be useful in situations where a feature is best expressed as a real number rather than as a yes/no answer. For instance, a feature predicting no-link based on a name's frequency in the population covered by the database could return a very high number for the name "Andrew" and a very low number for the name "Keanu". This is because a more common name like "Andrew" is more likely to be a non-link than a less common name like "Keanu".

3) Not using empirical expectations: Rather than using the empirical expectation of each feature over the training corpus in the Maximum Entropy Parameter Estimator, some other number can be used if the modeler has good reason to believe that the empirical expectation would lead to poor results. An example of how this can be done can be found in Ronald Rosenfeld, *Adaptive Statistical Language Modeling: A Maximum Entropy Approach* (Ph.D Thesis), Carnegie-Mellon University (1994), CMU Technical Report CMU-CS-94-138.

4) Minimum Divergence Model. A variation on maximum entropy modeling is to build a "minimum divergence" model. A minimum divergence model is similar to a maximum entropy model, but it assumes a "prior probability" for every history/future pair. The maximum entropy model is the special case of a minimum divergence model in which the "prior probability" is always 1/(number of possible futures). E.g. the prior probability for our "link"/"non-link" model is 0.5 for every training and testing example.

a) In a general minimum divergence model (MDM), this probability would vary for every training and testing example. This prior probability would be calculated by some process external to the MDM and the feature weightings of the MDM would be combined with the prior probability according to the techniques described in (Adam Berger and Harry Printz, "A Comparison of Criteria for Maximum Entropy/Minimum Divergence Feature Selection," *Proceedings of the Third Conference on Empirical Methods in Natural Language Processing* (June 1998)).

5) Using Machine-Generated Training data. The requirement that the model work entirely from human-marked data is not strictly necessary. The method could, for instance, start with link examples which had been joined by some automatic process (for instance by a match on some near-certain field such as social security number). Linked records, in this example, would be record pairs where the social security number matched exactly. Non-linked records would be record pairs where the social security number differed. This would form our training corpus. From this training corpus we would train a model in the manner described in the main body of this document. Note that we expect that the best results would be obtained, for this example, if the social security number were excluded from the feature pool. Hence when used in production, this system would adhere to the following algorithm:

a) If social security number matches on the record pair, return "link"

b) If social security number does not match on the record pair, return "non-link"

c) Otherwise, invoke the M.E. model built from the training corpus and return the model's probability of "link"

Note that this method will build a model which will be slightly weaker than a model built entirely from hand-marked data because it will be assuming that the social security number is a definite indicator of a match or non-match. The model built from hand-marked data makes no such assumption.

EXAMPLE

The present invention has been applied to a large database maintained by the Department of Health of the City of New York. System 10 was trained on about 100,000 records that were hand-tagged by the Department of Health. 15,000 "Gold Standard" records were then reexamined by DOH personnel, with two people looking at each record and a third person adjudicating in the case of a disagreement. Based on this training experience, system 10 had the evaluation results shown in FIGS. 3A and 3B and summarized below:

| Thresholds set for 98% precision: | | |
|---|---|---|
| | Precision | Recall |
| Link | 98.45 | 94.93 |
| No-Link | 98.73 | 98.16 |

| Thresholds set for 99% merge precision: | | |
|---|---|---|
| | Precision | Recall |
| Link | 99.02 | 90.49 |
| No-Link | 99.03 | 98.06 |

It can be seen that there is a tradeoff between precision (i.e., the percentage of records system 10 marks as "link" that should actually be linked) and recall (i.e., the percentage of true linkages that system 10 correctly identifies). In more detail: Precision=C/(C+I), where C is the number of correct decisions by system 10 to link two records (i.e, processor 12 and humans agreed that the record pair should be linked), and I is the number of incorrect decisions by system 10 to link to records (i.e., where processor 12 marked the pair of records as "link" but humans decided not to link). Furthermore, recall can be expressed as Recall=C/T, where T is the total number of record pairs that humans thought should be linked.

A further result of this evaluation is that with thresholds set for 98% merge precision, 1.2% of the record-pairs on which the DOH annotators were able to make a link/no-link decision (i.e. excluding those pairs which the annotators marked as "hold") needed to be reviewed by a human being for a decision on whether to link the records (i.e. 1.2% of these records were marked by system 10 as "hold"). With thresholds set for 99% merge precision, 4% of these pairs needed to be reviewed by a human being for a decision on whether to link the records. See FIGS. 3C–3E for sample link, no-link and undecided decisions.

This testing experience demonstrates that the human workload involved in determining whether duplicate records in such a database should be linked or merged can be cut by 96 to 98.8%. System 10 outputs probabilities which are correlated with its error rate—which may be a small, well-understood level of error roughly similar to a human error rate such as 1%. System 10 can automatically reach the correct result in a high percentage of the time, while presenting "borderline" cases (1.2 to 4% of all decisions) to a human operator for decision. Moreover, system 10 operates relatively quickly, processing many records in a short amount of time (e.g., 10,000 records can be processed in 11 seconds). Furthermore, it was found that for at least some applications, a relatively small number of training record-pairs (e.g., 200 record-pairs) are required to achieve these results.

Example Features

Features currently used in the application of the invention for the children's medical record database for the New York City Department of Health included all of the features found at the beginning of this section, "Detailed Description of the Presently Preferred Example Embodiments" plus the following additional example features from the system:

1. Features activating on a match between the parent/guardian name on one record and the child's last name on the other record. This enables a link to be detected when the child's surname was switched from his/her mother's maiden name to the father's surname. These features predicted link.
2. Features sensitive to the frequency of the child's names (when rarer names match, the probability of a link is higher). These features took as inputs a file of name frequencies which was supplied to us by the City of New York from its birth-certificate data. This file of name frequencies was ordered by the frequency of each name (with separate files for given name and surname). The most frequent name was assigned category 1. Category 2 names began with names which were half as frequent as category 1 and we continued on down by halves until the category of names occurring 3 times was assigned to the second-lowest category and names not on the list were in the lowest category. Our name-frequency category thus had features which were of the form (for a first name example) "First names match and frequency category of the first name is X—predicts link". Here X is one of the name categories. Higher values of X will likely be assigned higher weights by the maximum entropy parameter estimator (block 82 of FIG. 2D). This is an example of a general technique where, when a comparison of two records does not yield a binary yes/no answer, it is best to group the answers (as we did by grouping the frequencies by powers of 2) and then to have features which activate on each of these groups.
3. Edit distance features. Here we computed the edit distance between two names, which is defined as the number of editing operations (insertions, deletions, and substitutions) which have to be performed to transform string A into string B or vice versa. For instance the edit distance between Andrew and "Andxrew" is 1. The distance between Andrew and "Andlewa" is 2. Here the most useful feature was one predicting "merge" given an edit distance of 1 between the two names. We computed edit distances using the techniques described in Esko Ukkonen "Finding Approximate Patterns in Strings", *Journal of Algorithms* 6:132–137, (1985).
4. Compound features. It is often useful to include a feature which activates if two or more other features activate. We found this to be particularly useful in dealing with twins. In the case of a twin, often the only characteristic distinguishing two twins is their first name. Hence we included a feature which activated predicting no-link if both the multiple birth indicator was flagged as "yes" AND the first name differed. This feature was necessary because these two features separately were not strong enough to make a good prediction because they are both frequently in error. Together, however, they received a very high weight predicting "no-link" and greatly aided our performance on twins.

5. Details of the Soundex Feature. The Soundex algorithm produces a phonetic rendering of a name which is generally implemented as a four character string. The system implemented for New York City had separate features which activated predicting "link" for a match on all four characters of the Soundex code of first or last names and on the first three characters of the code, the first two characters, and only the first character. Similar features activated for mis-matches on these different prefixes.

6. Miscellaneous features. Using the invention in practice usually requires the construction of a number of features specific to the database or databases in question. In our example with New York City, for instance, we found that twins were often not properly identified in the "Multiple Birth Indicator" field, but they could often be detected because the hospital had assigned them successive medical record numbers (i.e. medical record numbers 789600 and 789601). Hence we wrote a feature predicting "no-link" given medical record numbers whose difference was 1.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A computer-assisted process for determining linkages between data records comprising:

constructing a predictive model based at least in part on a product divided by a sum of products;

training said predictive model with record pair linkage data, including the step of applying at least one machine learning method on a corpus of record pairs presented so as to indicate decisions made by at least one human decision maker as to whether said record pairs should be linked; and using said trained predictive model to automatically identify records that have a predetermined type of similarity to other data.

2. A process as in claim 1 wherein said predictive model comprises a maximum entropy model.

3. A computer-assisted process for linking records in at least one database including:

assigning weights to plural different factors predicting a link or non-link decision, using said assigned weights to calculate a probability=L/(L+N) where L=product of the weights of all features indicating link, and N=product of the weights of all features indicating no-link; and using said calculated probability to generate a predictive model; and applying said predictive model to automatically identify records within said at least one database that bear a predetermined relationship to one another.

4. The process of claim 3 further including constructing said predictive model using the maximum entropy modeling technique.

5. The process of claim 4 further including executing said maximum entropy modeling technique on a corpus of record pairs which have been marked by at least one person with a decision as to that person's degree of certainty that the record pair should be linked.

6. The process of claim 3 further including creating a predictive model based on said calculated probability, including constructing said predictive model using a machine learning technique.

7. The process of claim 6 further including executing said machine learning technique on a corpus of record pairs which have been marked by at least one person with a decision as to that person's degree of certainty that each record pair should be linked.

8. The process of claim 1 wherein:

said predictive model comprises a minimum divergence model.

9. A method as in claim 8 wherein said minimum divergence model comprises a maximum entropy model.

10. A method as in claim 8 wherein said training step includes calculating a probability $L/(L+N)$ where L is the product of the weights of all features indicating that first and second data items bear a predetermined relationship, and N is the product of the weights of all features indicating that said first and second data items do not bear said predetermined relationship.

11. Apparatus for training a computer-based predictive model based at least in part on a product divided by a sum of products for determining whether at least two data items have a predetermined relationship, said apparatus comprising:

an input device that accepts a training corpus comprising plural pairs of data items and an indication as to whether each of said plural pairs bears a predetermined relationship;

a feature filter that accepts a pool of possible features, and outputs, in response to said training corpus, a filtered feature pool comprising a subset of said pool; and a maximum entropy parameter estimator responsive to said training corpus, said estimator developing weights for each of said features within said filtered feature pool for use with said computer-based predictive model.

12. Apparatus as in claim 11 wherein said feature filter discards features not useful in discriminating between plural pairs of data items that bear a predetermined relationship and plural pairs of data items that may not bear a predetermined relationship.

13. Apparatus as in claim 11 wherein said feature filter discards features not useful in discriminating between plural pairs of data items that do not bear a predetermined relationship and plural pairs of data items that may bear a predetermined relationship.

14. Apparatus as in claim 11 wherein said estimator constructs a model which calculates a linkage probability based on features within the filtered feature pool that indicate an absence of linkage and features within the filtered feature pool that indicate linkage.

15. Apparatus as in claim 11 wherein said estimator outputs a real-number parameter for each feature in the filtered feature pool, said real-number parameter indicating a weight.

16. Apparatus for determining whether pairs of data items bear a predetermined relationship, said apparatus comprising:
- an input system that accepts pairs of data items; and
- a discriminator that determines whether each pair of data items bears a predetermined relationship, said discriminator including a trained computer-based minimum divergence model based at least in part on a product divided by a sum of products,
- wherein said discriminator computes the probability that said pair of data items bears said predetermined relationship.

17. Apparatus as in claim 16 wherein said computer-based minimum divergence model comprises a trained maximum entropy model.

18. Apparatus as in claim 16 wherein said discriminator calculates the probability of linkage as $L/(N+L)$ where L is the sum of weighted features indicating that said data items bear said predetermined relationship, and N is the product of weighted features indicating said plural data items do not bear said predetermined relationship.

19. The process of claim 1 further including determining a set of weights each corresponding to features empirically selected to indicate either that a pair of data items bear said predetermined relationship or that said plural data items do not bear said predetermined relationship, said features and said set of weights providing a maximum entropy model.

* * * * *

UNITED STATES PATENT AND TRADEMARK OFFICE
CERTIFICATE OF CORRECTION

PATENT NO.    : 6,523,019 B1                                             Page 1 of 1
DATED         : February 18, 2003
INVENTOR(S)   : Borthwick It is certified that error appears in the above-identified patent and that said Letters Patent is hereby corrected as shown below:

<u>Column 20,</u>
Line 3, delete the word "sum" and insert the word "product".

Signed and Sealed this

Ninth Day of March, 2004

JON W. DUDAS
*Acting Director of the United States Patent and Trademark Office*